US011070767B1

(12) United States Patent
Brown, Jr.

(10) Patent No.: US 11,070,767 B1
(45) Date of Patent: Jul. 20, 2021

(54) THIRD WITNESS VIDEO PARTICIPATION SYSTEM AND METHOD

(71) Applicant: Telecare LLC, West Milford, NJ (US)

(72) Inventor: Jacob T. Brown, Jr., West Milford, NJ (US)

(*) Notice: Subject to any disclaimer, the term of this patent is extended or adjusted under 35 U.S.C. 154(b) by 0 days.

(21) Appl. No.: 17/066,796

(22) Filed: Oct. 9, 2020

(51) Int. Cl.
| | |
|---|---|
| *H04N 7/15* | (2006.01) |
| *H04N 7/14* | (2006.01) |
| *G05D 1/00* | (2006.01) |
| *G08C 17/02* | (2006.01) |
| *H04M 1/725* | (2021.01) |

(52) U.S. Cl.
CPC .......... *H04N 7/147* (2013.01); *G05D 1/0016* (2013.01); *G08C 17/02* (2013.01); *H04M 1/725* (2013.01); *H04N 7/155* (2013.01)

(58) Field of Classification Search
CPC ............ H04N 7/14; H04N 7/15; H04N 7/185; H04N 21/4788; H04N 7/155; H04M 1/725; G08C 17/02; G05D 1/00
USPC ........................................... 348/14.01–14.16
See application file for complete search history.

(56) References Cited

U.S. PATENT DOCUMENTS

| | | | | |
|---|---|---|---|---|
| 2005/0045103 | A1* | 3/2005 | Mikhael | H05H 1/2406 118/723 E |
| 2011/0320370 | A1* | 12/2011 | Henry, Jr. | G06Q 10/10 705/311 |
| 2018/0025454 | A1* | 1/2018 | Redmon | H04W 4/025 705/311 |
| 2018/0222059 | A1* | 8/2018 | Ragula | G05D 1/0038 |
| 2018/0322749 | A1* | 11/2018 | Kempel | G05D 1/0094 |
| 2019/0132548 | A1* | 5/2019 | Duale | H04L 65/403 |
| 2019/0184910 | A1* | 6/2019 | Bazille | H04N 21/4223 |
| 2019/0391256 | A1* | 12/2019 | Bowring | G01S 7/417 |

* cited by examiner

*Primary Examiner* — Melur Ramakrishnaiah
(74) *Attorney, Agent, or Firm* — McKay Law

(57) ABSTRACT

A video conferencing and law enforcement corroboration system. A video feed is established between actors including a law enforcement officer and a perpetrator, thereby forming a remote, real time communication between the two. Greetings are remotely exchanged, which can be pre-scripted such that the perpetrator may remotely ask for a reason for a stop using impartial, prompted language, to thereby objectivize initial contact. The officer is prompted to invite participation by a corroborating third party, wherein a two-way, real-time communication of a video feed can generate conference information. The identity of the perpetrator, a driver document and a vehicle search can occur remotely via a real time communication, wherein an interaction between a law enforcement officer and a perpetrator is documented without physical conflict and without exposing a perpetrator and a law enforcement officer to physical harm and violence.

9 Claims, 66 Drawing Sheets

Actors and Use Cases

SEE NARATIVE UNDER SEPARATE COVER FOR EXPLANATION FOR THIS SECTION TO INCLUDE "ACTORS" "USE CASES" "CONTACT"

Use cases 102

1. Register & Login  103

1.1.1 Register FOR LAW ENFORCEMENT OFFICERS

LEO PROFILE INFORMATION 1.2 Login

2. Contact Management For LEO    104

2.1 Show nearby users 2.2 LEO Initiating Contact with Citizen 2.3 LEO Contacting Other LEOs 2.4 Contact List 2.4.1 Browse user information 2.4.2 Delete from contact list Comment
This means that this user was already contacted. If didn't contacted, then it'll be replaced with  icon.

3.1 A/V Conference Controlled by LEO 3.1.1 Send Conference Request Initiated by LEO to Other LEOs and/or Citizens 3.1.3 Audio conference 3.1.4  Text chatting 3.2 E-mail 3.3 Send Urgency Alert For contact between LEOs and will be, in special circumstances, (ie. Suicide bomb, terrorist) available to contact the public.

3.4 Send photo ID

LEO can send his photo ID to Citizen via e-mail.

3.5 Issue Ticket

LEO can issue ticket to Citizen.

3.6 Issue summons

LEO can issue summon to Citizen.

4. Recording Management   106

4.1 Start Recording 4.2 Stop Recording 4.3 Communication History 4.3.2 Receive Certified Copy 5. Settings 5.2 Set Auto Greeting 5.3 Set Auto Recording 5.4 Set translate service When LEO register to TWA, a translate service and phone number will be set automatically, and LEO can change it here.

5.5 Log out

THIRD WITNESS VIDEO PARTICIPATION SYSTEM AND METHOD

BACKGROUND

Law enforcement is entrusted with the responsibility of protecting the public. Most law enforcement officers risk their lives every day to perform their duty with honor and integrity. However, there are a small percentage of law enforcement officers that abuse their authority and violate the honor of their profession and the public trust. Unfortunately, the misdeeds of these few are, too often, generalized to the larger group of law enforcement officers and distort the image and reputation of a very noble and honorable profession.

In addition to allegations of graft, corruption and the use of excessive force, recent shootings of unarmed victims have exacerbated the mistrust between Law enforcement and various segments of the Public; this is especially true for minorities. Eye witness testimony and video recordings of conflict between law enforcement and persons arrested, beaten or killed have not been accepted as sufficient evidence of abuse for there to be an indictment, trial of law enforcement officers or allow for an impartial review of all the information associated with the incident. Although law enforcement officers are rarely indicted, they are not perceived as innocent by the public. This scenario has created a perception of a legal system that is prejudiced and unjust. The public feels violated and abused by law enforcement, abandoned by the Court and the legal system.

When law enforcement (Police) are the victims of a shooting or violence prior corruption and acts of abuse against the public is often used as justification for revenge and violence against them, although the victims may not be the ones who committed the transgressions. In the aftermath, law enforcement often become both more defensive and offensive in their actions and assumes a "us against them" posture and reaction towards the public they are entrusted to protect.

In spite of the aforementioned, it is also true that most of the public recognizes, respects, and depend upon law enforcement to protect them from danger and harm. However, the transgressions of a minority of officers have created an environment of fear and mistrust for a significant portion of the Public.

There is no logical expectation that conflict between the law enforcement and the public will diminish or be amicably resolved at any time in the foreseeable future. This is especially true since tradition plays a strong role in the training of Law Enforcement. The practice of being brave, courageous and subjecting one-self to violence and harm prevail even though it is not always practical or necessary.

In order for there to be any progress towards repairing the credibility of the US Justice System and the relationship between police and the public, creative initiatives need to be taken that will be accepted as fair and effective by law enforcement, the public, and the Courts.

There is a vast array of devices and tools, cameras, sensors, microphones etc., to assist Law Enforcement Officers (LEO) in doing their job. Unfortunately, in most instances, the LEO must to physically expose themselves to the Citizen in order to use these devices or only receive the benefit of recording an interaction event, but not preventing any harm or violence to themselves or Citizens (Perpetrators).

For instance, processes and systems for recording interactions between law enforcement officers and citizens are known in the art. For example, U.S. Patent Pub. 2006/0165160 to Winningstad teaches one-way video recording between officer and citizen. U.S. Pat. No. 7—38,956 to Change et al. teaches the use of one-way A/V conferencing to record a similar interaction. Such systems are archaic largely because one-way A/V recording does nothing to prevent exposure to, or minimize initial risk of danger to both parties, nor does the technology provide the ability to exchange documents and perform stop procedures remotely. Notwithstanding the equipment being large and cumbersome the benefits of recordings are after the fact evidence of what transpired.

U.S. Pat. Pub. No. 20160173950 to Brown introduced two-way conferencing between LEO and Citizen. Needed then is an application which prevents the harm and violence LEO and Citizens traditionally inflict on each other before, rather than after the fact, using smartphone technology applications with specially modified software that allows LEO to communicate virtually (remotely) with Citizens and perform multiple law enforcement duties from remote and safe distances without LEO or Citizen being physically able to harm each other.

SUMMARY

Termed herein third witness application (TWA), the TWA uses mobile application software technology to:

(1) Allow LEO to make contact with citizens, communicate and perform their work at a safe distance virtually, and thus remotely.

(2) Allow Citizen to respond to requests for communication from LEO without fear of abuse and without exhibiting provocative behavior that results in conflicts of mutual violence and/or abuse. (see TWA video, . . . )

(3) save the lives of law enforcement officers and the public;

(4) reduce the use of excessive force and physical conflict between law enforcement and the public;

(5) Provide LEO and Citizen with evidence to deter false accusations of what transpired during the contact; and, (6) establish mutual respect and trust between law enforcement and the public.

The TWA offers specially created features to establish a technology standard of behavior and procedures to be exercised by law enforcement and the public citizen when they come into contact with each other. It is hoped that these features will save lives, minimize the need to use force by law enforcement, improve relations between law enforcement and the public and restore credibility to the US legal system.

TWA is a technology system, mobile application software, computer-implemented method and/or non-transitory medium for a multi-level video recording process including the step of inviting participation by the alleged perpetrator and a corroborating third party of supervisors, legal, health, personal and public representatives.

Accordingly, comprehended is a mobile software application compartmentalized into a LEO and a Citizen version, then each further comprising a module, namely: (1) use case and actor designation; (2) registration/login; (3) contact management; (4) communications; (5) recording; (6) device remote control. The process then generally comprises the steps of establishing a video feed between a law enforcement officer and a perpetrator; noticing the perpetrator of the video feed provided the law enforcement officer has established the video feed; noticing the law enforcement officer of the video feed provided the perpetrator has established the video feed; inviting participation by a corroborating third party; and, sharing the video feed, wherein an interaction between the law enforcement officer and the perpetrator is both documented and corroborated. The feed being recorded thereby forms a record which can be sent to a central processing unit, thereby forming an event record, wherein the event record can be stored and used in criminal proceedings as it relates to the perpetrator. The recordings are (a) voluntarily saved on the users device, or if recording is involuntarily interrupted, it is automatically transmitted to central storage. The integrity of all recordings transmitted voluntarily or involuntarily to central storage are certified to be untampered representations of the recorded event. Only users or persons in possession of the recording ID number can retrieve a copy of the recording.

More particularly, comprehended is a video conferencing and law enforcement corroboration system, comprising a smartphone including a camera and mobile application software having an application programming interface and control logic stored therein for causing a smartphone to establish a video feed between actors including a law enforcement officer and a perpetrator, the video feed created by a law enforcement officer, thereby forming a remote, real time communication between the law enforcement officer and the perpetrator; notice the perpetrator of the video feed provided the law enforcement officer has established the video feed; allow for an exchange of pre-scripted auto greetings, wherein the perpetrator may remotely ask for a reason for a stop using impartial, prompted language, to thereby objectivize initial contact between the law enforcement officer and the perpetrator; prompt the law enforcement officer or a perpetrator to invite participation by a corroborating third party, wherein a two-way, real-time communication of a video feed can generate conference information; view an identity of the perpetrator, a driver document and a vehicle search remotely via a real time communication between a law enforcement officer and a perpetrator, wherein an interaction between a law enforcement officer and a perpetrator is documented without physical conflict and without exposing a perpetrator and a law enforcement officer to physical harm and violence; share the conference information, wherein an interaction is corroborated without exposing a law enforcement officer and a perpetrator to physical harm and violence; a use case and actor designation module as part of a mobile application software, wherein all LEO actors associated with the mobile application software are vetted for purposes of registration; a contact management module as part of the mobile application software, wherein a law enforcement officer is the only of the actors who is able to initiate an initial contact with the perpetrator; and, a recording module as part of a mobile application software, wherein a communication is automatically stored on the smartphone and activated upon touching an icon.

DETAILED DESCRIPTION OF THE PREFERRED EMBODIMENT

Figure 1:
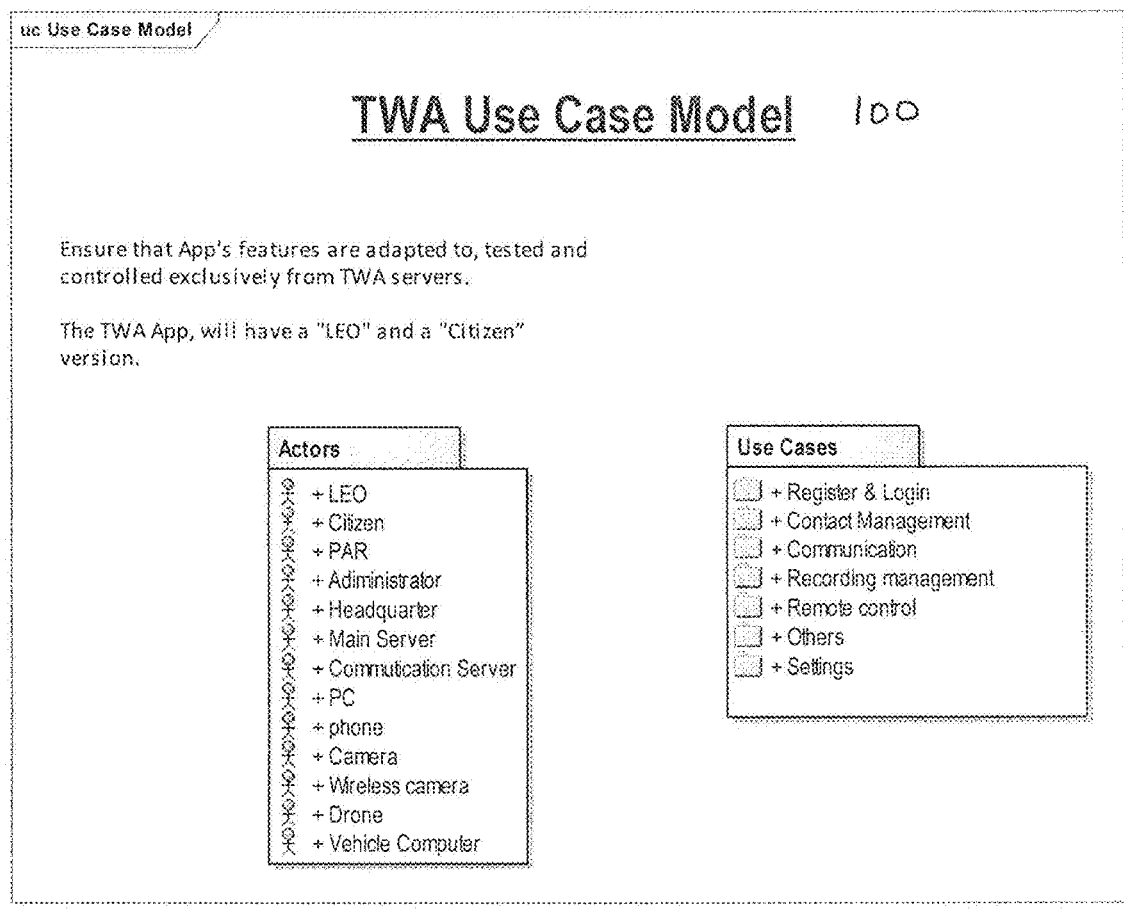
FIG. 1 is a diagrammatic illustration of the application's use case model.

The description represents a method with logic or program flow that can be executed by a specialized device or a computer and/or implemented on computer readable media or the like tangibly embodying the program of instructions. The executions are typically performed on a computer or specialized device as part of a global communications network such as the Internet. All environments herein, including but not limited to the contact management system, the communication process, the task performance process, the recording management and the remote control system may be described in the general context of computer-executable instructions, such as program modules, being executed by a computer. Generally, program modules include routines, programs, objects, components, data structures, etc. that perform particular tasks or implement particular abstract data types. A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general-purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). The data or program modules may include an operating system, application programs, other program modules, and program data. At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool.

In addition, structurally, the system may comprise, in part, wearable video cameras or wireless camera accessories. As used herein, "wireless camera accessory" means the wireless camera itself or any component on which a camera is mounted. It should be understood in the exemplary embodiment that other wireless camera accessories, clips, belts and other implements can be worn at the body of law enforcement officers. Thus, wearable cameras are being proposed to be worn by law enforcement officers to record their interaction with the public. "Law enforcement officer" means any individual whose duties primarily involve the enforcement of laws and who, by way of that authority, can approach a citizen of the general public for questioning. The phrase can include police officers, special police officers, customs officers, state troopers, special agents, special investigators, border patrol officers, immigration officers, court bailiffs, correctional officers, probation officers, parole officers, arson investigators, auxiliary officers, game wardens, sheriffs, constables, marshals, and deputies. The public would be an individual citizen of the general public. An individual who may be approached and questioned by law enforcement would therefore be an alleged "perpetrator" of the act in question, whether legally in violation of the law or not. So, the one-way communication is between the law enforcement officer and the perpetrator. "Corroborating third party" is the third or more individuals or group of individuals who are conferenced in to witness the communications, gestures, or other acts between the law enforcement officer and the perpetrator. Accordingly, the instant "Third Witness" application (TWA) includes a video conferencing capability and other technological features that encourage communication between both law enforcement and public and more objectively "documents" the contact and ensuing events and "corroborates" same, solely with virtual contact.

The disclosure of U.S. Pat. Pub. No. 20160173950 to Brown is incorporated herein by reference in its entirety.

Figure 1A:
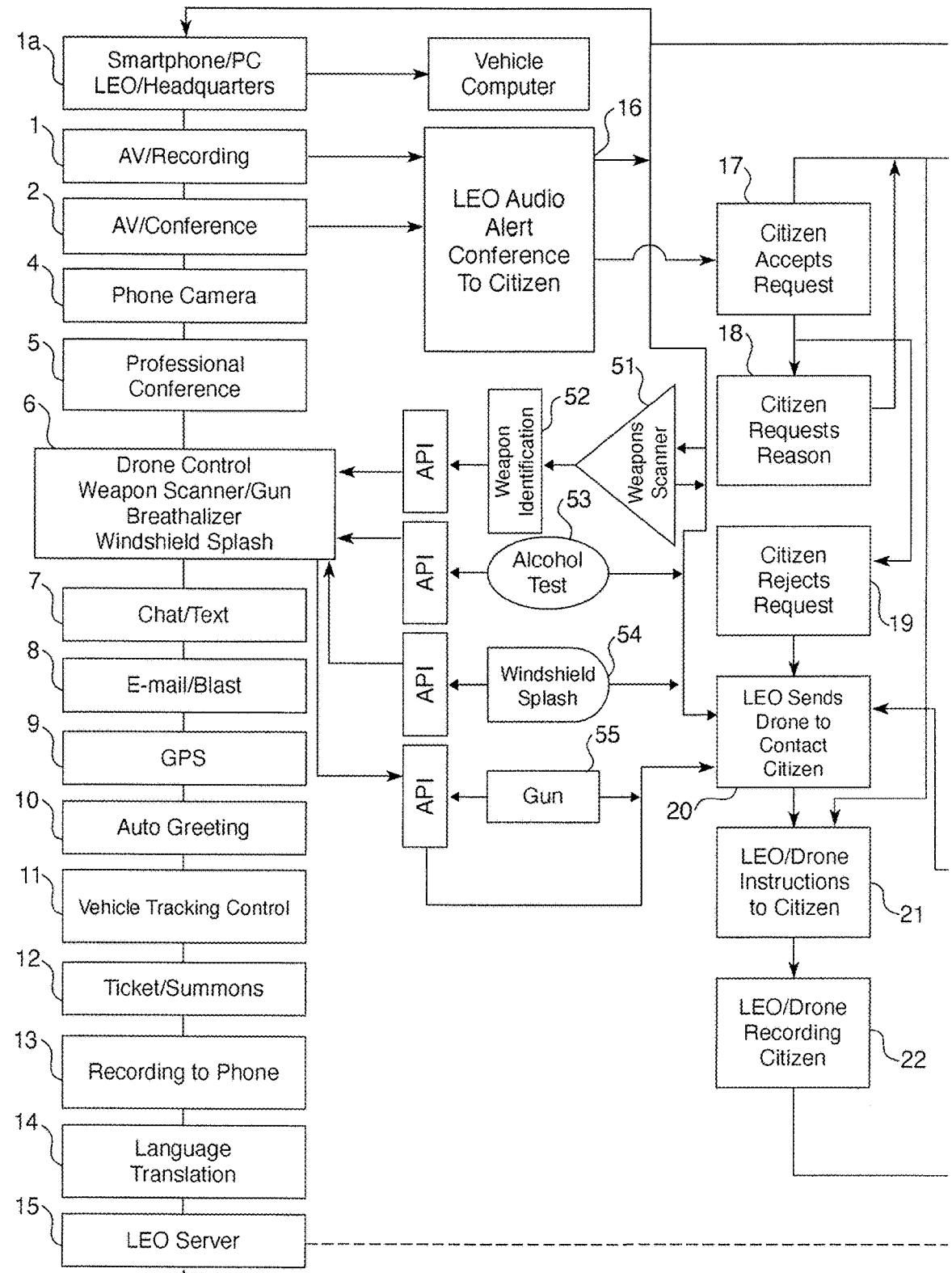
FIGS. 1a and 1b shows a flow chart of the overall process.
Figure 1B:
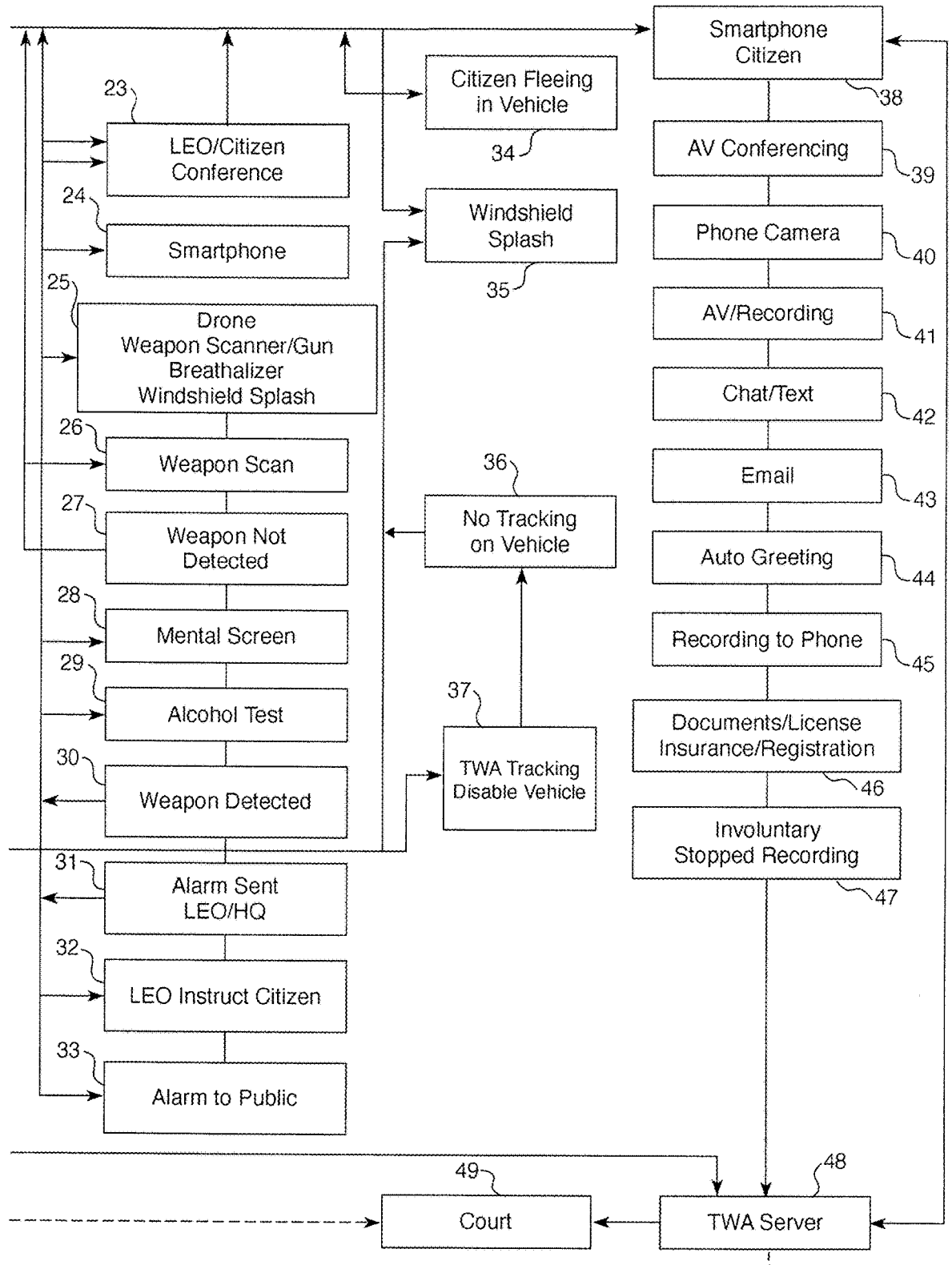

With reference then to FIG. 1A, represented by flow chart is smart phone software application and features as an exemplary embodiment of the computer and processor, which employs a smartphone 1a including a camera 4 and mobile application software having an application programming interface and control logic stored therein for causing the smartphone 1a to establish a video feed 1, 2 between actors including a law enforcement officer and a perpetrator, said video feed created by a law enforcement officer, thereby forming a remote, real time communication between a law enforcement officer and a perpetrator. The perpetrator is noticed of the video feed provided the law enforcement officer has established the video feed and pre-scripted auto-greetings 10 are allowed to be exchanged, wherein the perpetrator may remotely ask for a reason for a stop using impartial, prompted language, to thereby objectivize initial contact between the law enforcement officer and the perpetrator. The actors are prompted to invite participation by a corroborating third party, wherein a two-way, real-time communication of a video feed can generate conference information 5. In addition an identity of the perpetrator can be obtained, and a driver document 12 and a vehicle search can occur remotely via a real time communication between a law enforcement officer and a perpetrator, wherein an interaction between a law enforcement officer and a perpetrator is documented without physical conflict and without exposing a perpetrator and a law enforcement officer to physical harm and violence. The conference information is shared, wherein an interaction is corroborated without exposing a law enforcement officer and a perpetrator to physical harm and violence.

The system further includes the following features:

Records contact and events between Police and Citizen—The software is designed so that when the TWA logo (icon) is touched, the App recording feature starts automatically for LEO and citizen actors. Once recordings commence, they cannot be stopped unless the actor enters a password, thus assuring that the recording was not involuntarily stopped. If recording is voluntarily stopped, users have the option of saving a copy of the recording on their device. Recording ID numbers can be created and provided to the actor. The status of the recording being stopped as voluntary or involuntary can be transmitted to the TWA server (administration). Only the registered TWA user LEO or Citizen receives a copy of the recording ID that can be later retrieved from the server, thereby access and retrieval to recordings are encrypted and user privacy cannot be violated;

Two way interactive A/V Conferencing to allow for remote communication between Police and Citizens—the software is designed to create a virtual contact and communication between actors, including LEOs and the public/perpetrator to reduce the risk of violence and unexpected altercations;

Camera embedded in drone, vehicle computer and all devices used to access the Internet;

Professional Conference allows for interactive remote, real time A/V communication between Police, other Law Enforcement Officers (LEOs) and relevant professional. Use of this feature is reserved exclusively for LEOs;

Drone technology and control will use application programming interface (API) to be integrated into the TWA application software. It will control the Drone camera, speed, position and location. The Drone represents a technological substitute for the Police's physical presence and contact with the Citizen. Weapon scanning and identification technology, alcohol testing (breathalyzer), windshield splash (visual impairment pack composed of alcohol, mineral oil, colored dye, volatile silicones, film formers, plasticizers and polymer. Firearm capability and control will be integrated into the application and Drone software;

Text and Chat features will be available to Police and Citizens as alternative form of communication;

Emails will be available to Police and Citizens—the ability to email multiple LEOs in the vicinity (Blast) is limited to use by Police and other LEOs;

Blue Tooth GPS will locate and identify the location and proximity of nearby TWA users. Police will be able to connect to Citizens and other LEOs. Citizen will not be able to initiate contact with any Citizen user and will only be able to accept or decline a request for conferencing by Police or other LEOs registered with TWA;

Pre-scripted auto greeting and responses are integrated into the App for Police and Citizen to neutralize otherwise provoking emotional verbal communication between Police and Citizens;

Vehicle tracking is inserted into vehicle fuel system and can disable a vehicle from unauthorized and unlawful movement. This feature is controlled remotely from the TWA for registered users. Software integrated into vehicle computer;

Police can issue tickets and summons remotely to Citizens from their devices; LEO can take a photographs of the traffic ticket, and attach it to an e-mail program for sending to the citizen/perpetrator, thus any citation can be served remotely without having to use traditional paper and deliver the paper personally, thereby limiting physical exposure.

Copy of all recordings will be transmitted and:
  stored on the device that recorded the event;
  transmitted to TWA servers; and
  if involuntarily interrupted, recordings will automatically be submitted to TWA servers;
  certified copy of recordings transmitted to Court;

Immediate language translation in real time will allow LEO to communicate and receive information on a global basis;

All recordings will be transmitted to TWA servers and to LEO's servers with the option to be sent to the Court having jurisdiction in the area where the recording was produced;

LEO uses push/local notification to alert Citizen to a request to conference. Recording is automatically started;

(22) Citizen accepts request, proceeds to conference with Police;

Citizen requests Police to provide reason for contact via natural voice or use of auto response feature;

Citizen rejects Police request to conference. Police are notified, and decision is to use Drone to continue effort for communication or physically approach Citizen alone or use e-mail blast for LEO backup;

Police sends Drone, obtains a visual, initials verbal communication and instructions;

Police sends Drone to Citizen who has accepted request and proceeds with weapon scan, mental screen and test for alcohol;

Remote recording of Drone contact between Police and Citizen;

Citizen has accepted request to conference via Smart Phone, Computer or Drone and participants in any of the referenced features #26-30;

If weapon not detected, Police have option to continue communication via Smart Phone or more in depth contact via Drone conducting weapon, mental health, and alcohol evaluation as previously described;

If weapon detected, an Alert/Alarm immediately transmitted to LEO and Police Headquarters;

LEO provides instructions to Citizen (i.e., don't move, look into the camera, etc.). Drone fire/arm/gun feature may be activated by LEO/Headquarters;

If Citizen or Person is carrying explosives, text or audio instructions alarm are transmitted by LEO or Police Headquarters to the public in proximity;

If Citizen is fleeing in a vehicle, LEO will attempt communication
  Via Smart Phone, if TWA connected
  Disable Vehicle remotely using vehicle tracking control;

(37) If Citizen not TWA user and/or disabling tracking control not an option, LEO/Headquarters can dispatch Drone. Drone can hover over vehicle in a static or moving position and release 35. Windshield splash which will immediately impair visual ability to drive the vehicle. The Drone firearm gun may be activated by LEO or Headquarters;

38-47. Citizen Smart phone menu and features;

46. License, Registration, Insurance, Special Permits (i.e., gun) LEO ID;

47. TWA server capture and retrieves Police and Citizen recordings, submitted and involuntarily stopped. Police can request a copy of recording to be automatically transmitted to their servers;

15, 48-49. Police and Citizen can request that a certified copy of the recording be transmitted to court or jurisdiction where contact and event was recorded or some other court or jurisdiction;

50. Application programming interface (API) will be used to integrate weapon scanner software into TWA app to control scanner features;

51. Weapons scanner—LEO will use infrared, radio magnetic waves to detect weapons that may be concealed on Citizen's body. The scanner will also identify the type of weapon (i.e., knife, gun, explosives, etc.);

52. Weapon Identification data base;

53. Alcohol test (breathalyzer) will be delivered by Drone to Citizen. Results will be transmitted back to LEO in real time;

54. Windshield splash will be carried in the plastic 10 oz packets that will break open upon impact with windshield and disperse a quick drying colored solution that will solidify and harden on windshield. Attempts to clear windshield with wiper will only intensify the smear. The solution is composed of alcohol, mineral oil, colored dye, volatile silicones, film formers, plasticizers and polymers;

55. Guns will be adapted to Drones and remotely controlled by LEO and Headquarters for special security escorts, monitoring and dispatched to hostage, terrorist, suicide bomber and active shooter scenarios.

Referencing now the remaining figures, beginning with FIG. 1, shown is the instant methodology performed, for instance, with an accompanying mobile software application available on smart phones and other mobile devices which includes a law enforcement version and a public, or "citizen" version as the use case model 100. Critically, use case model 100 is configured to use two-way interactive video conference and recording (rather that one-way video recording) between law enforcement and the public with date, time and location as part of the record.

Figure 2:
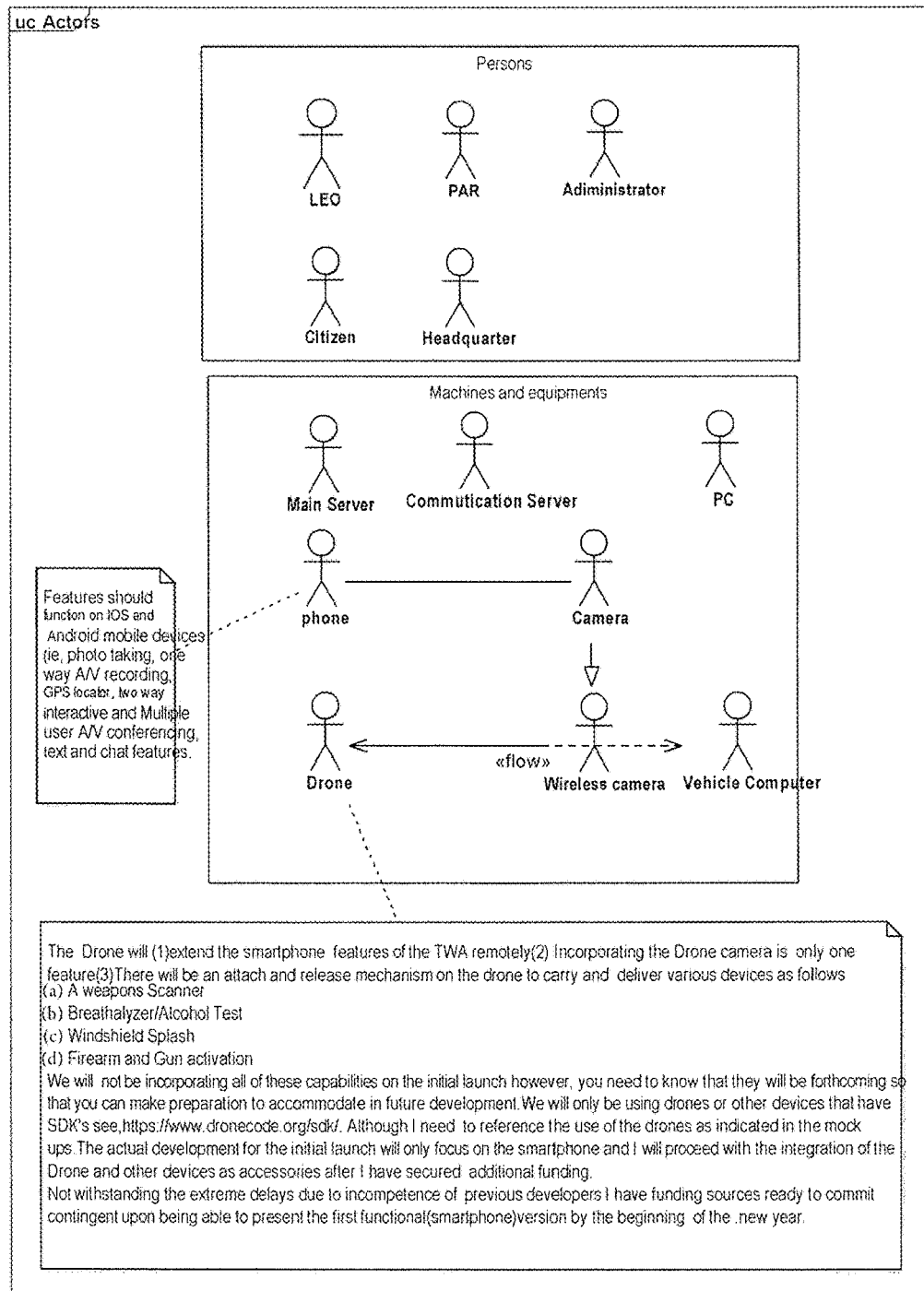
FIG. 2 is a diagrammatic illustration depicting the actors.
Figure 3:
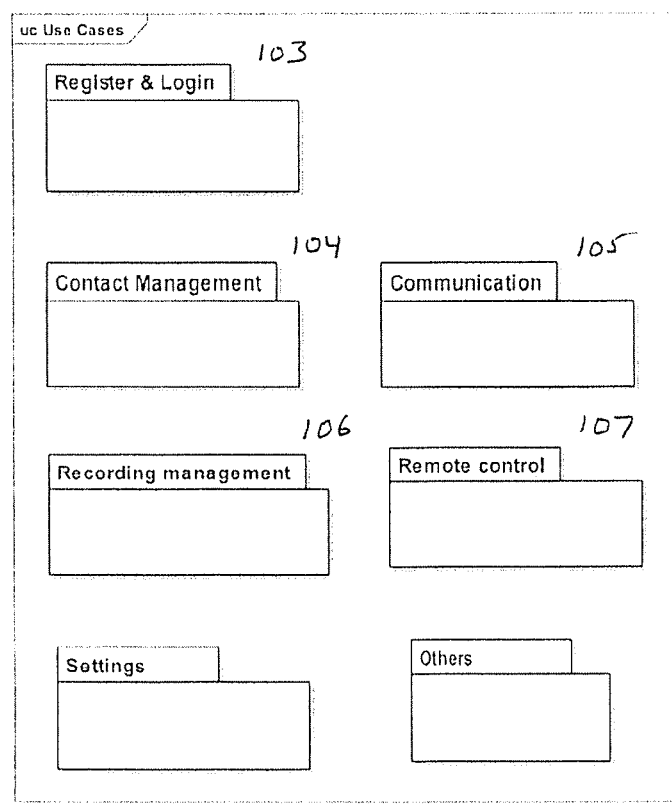
FIG. 3 is a diagrammatic illustration depicting the use cases.
Figure 4:
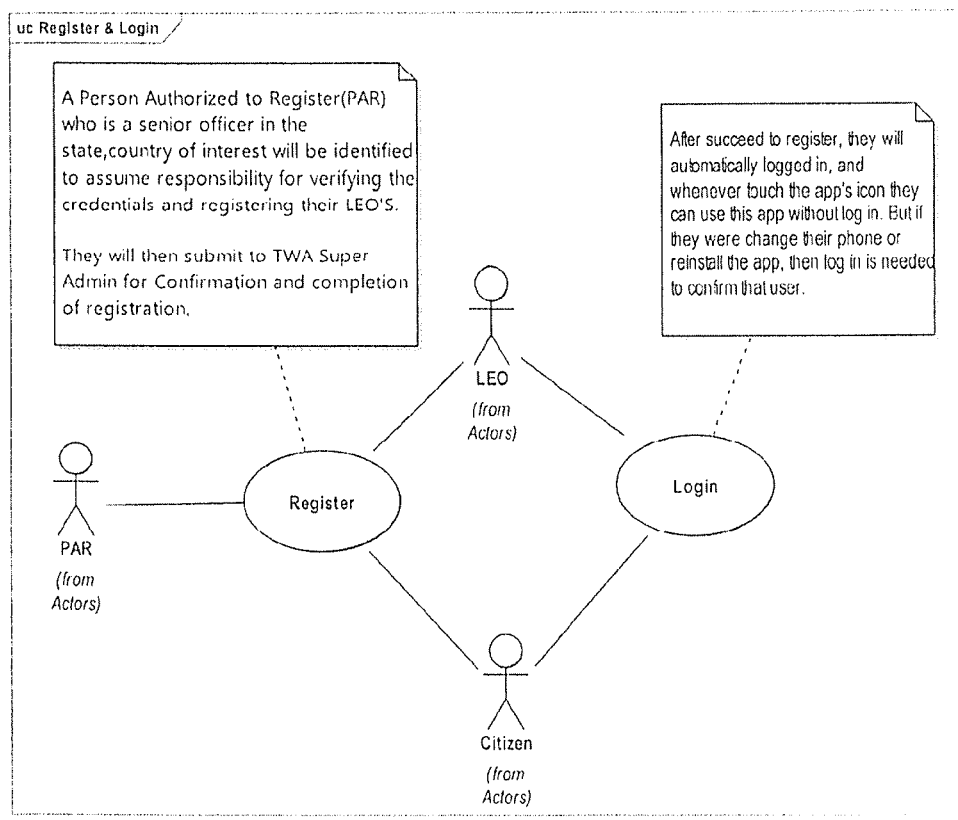
FIGS. 4-9 are diagrammatic illustrations and elevational view of the user interfaces showing the registration process for the citizens and the law enforcement officers.
Figure 5:
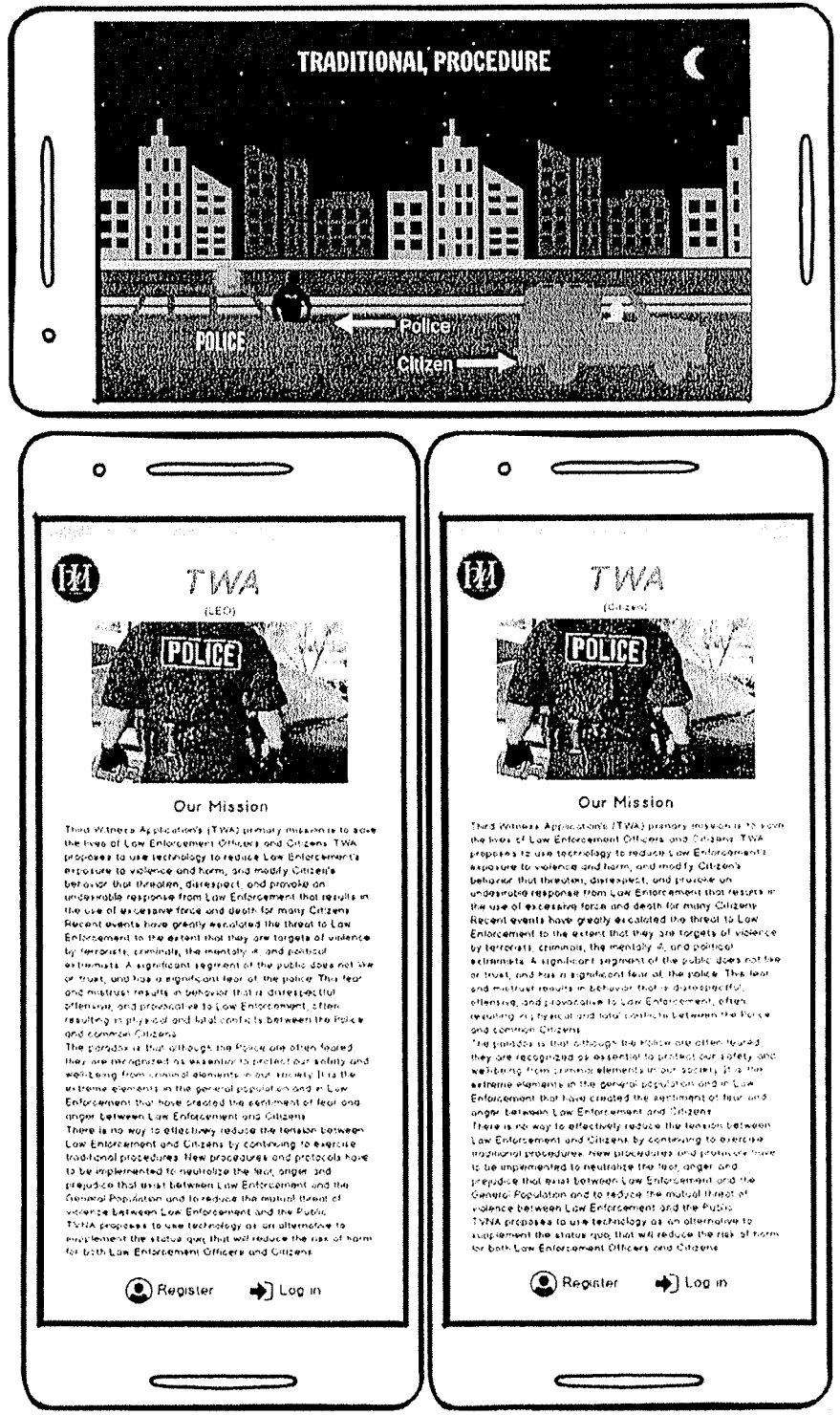
Figure 6:
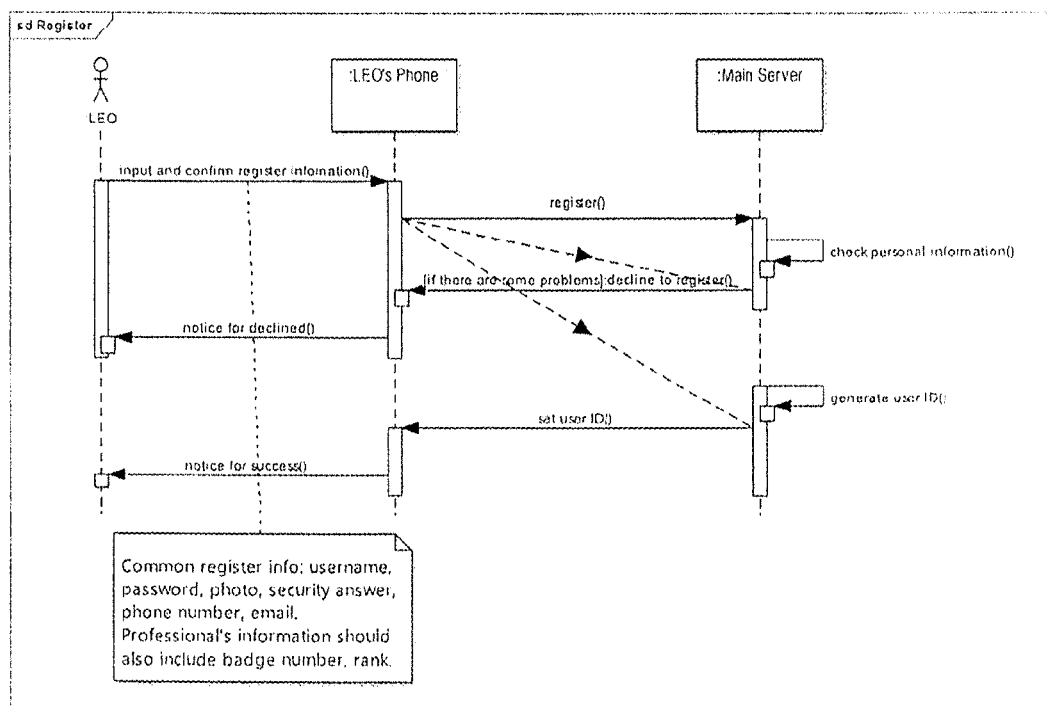
Figure 7:
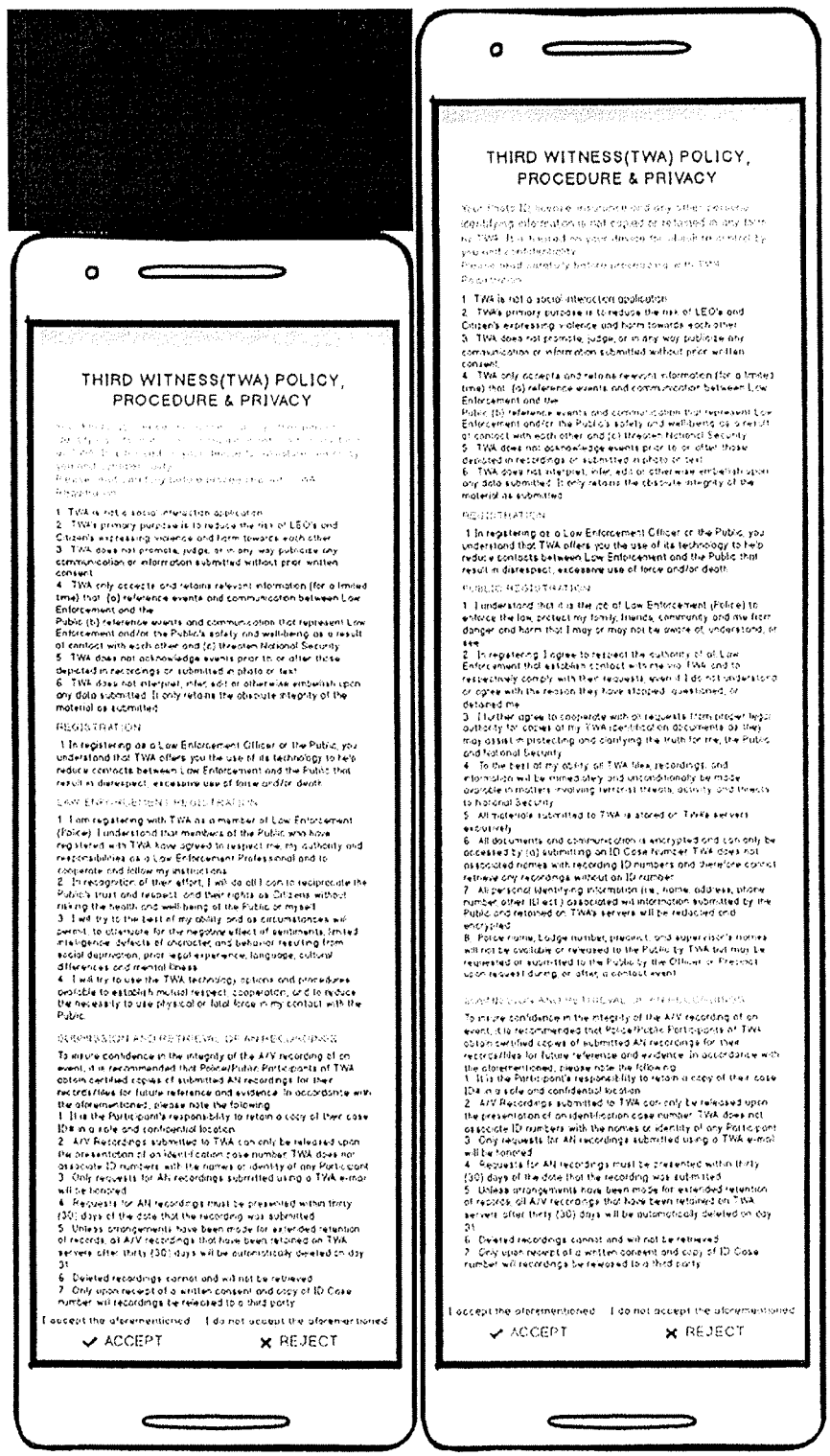
Figure 8:
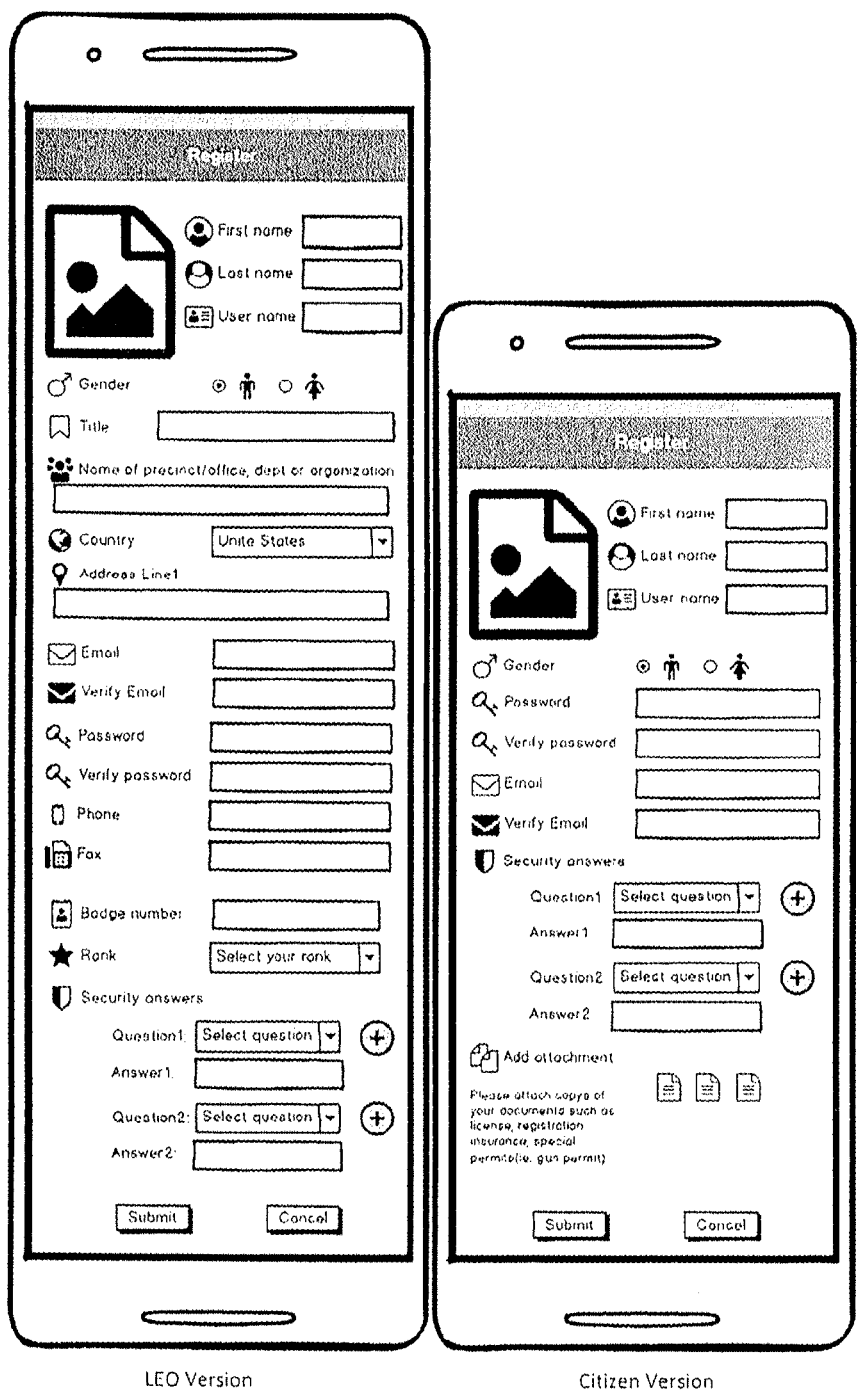
Figure 9:
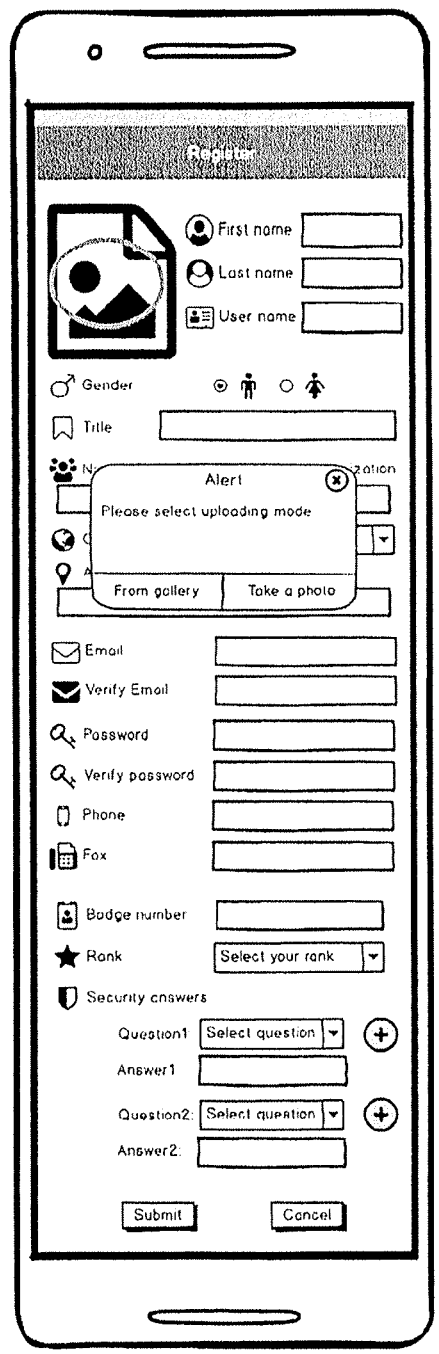
Figure 10:
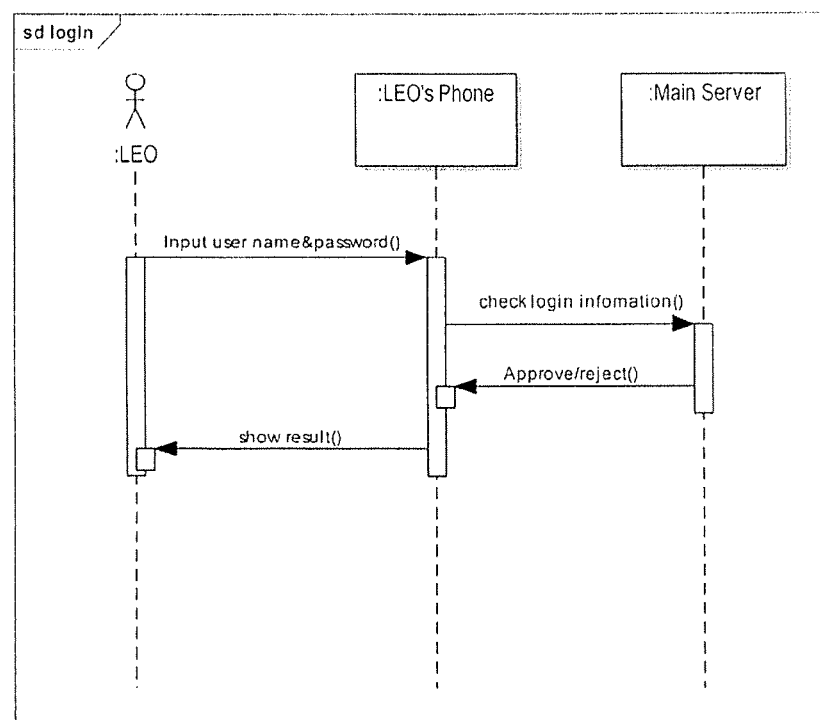
FIG. 10 is a diagrammatic illustration and elevational view of the user interface showing the login process.
Figure 10:
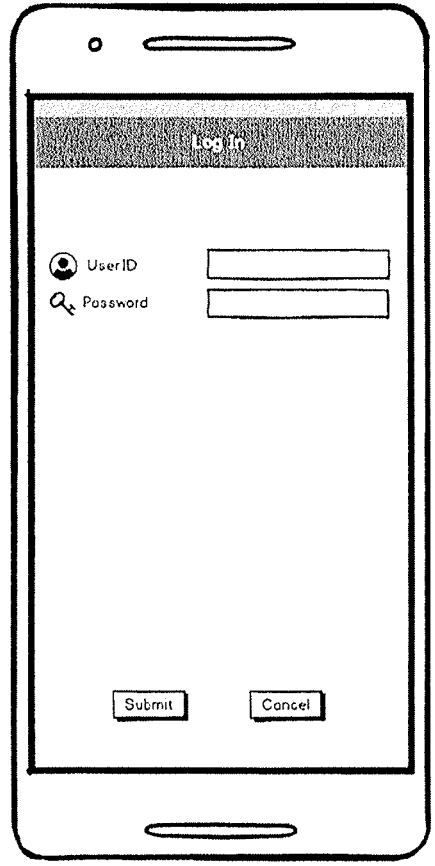
Figure 11:
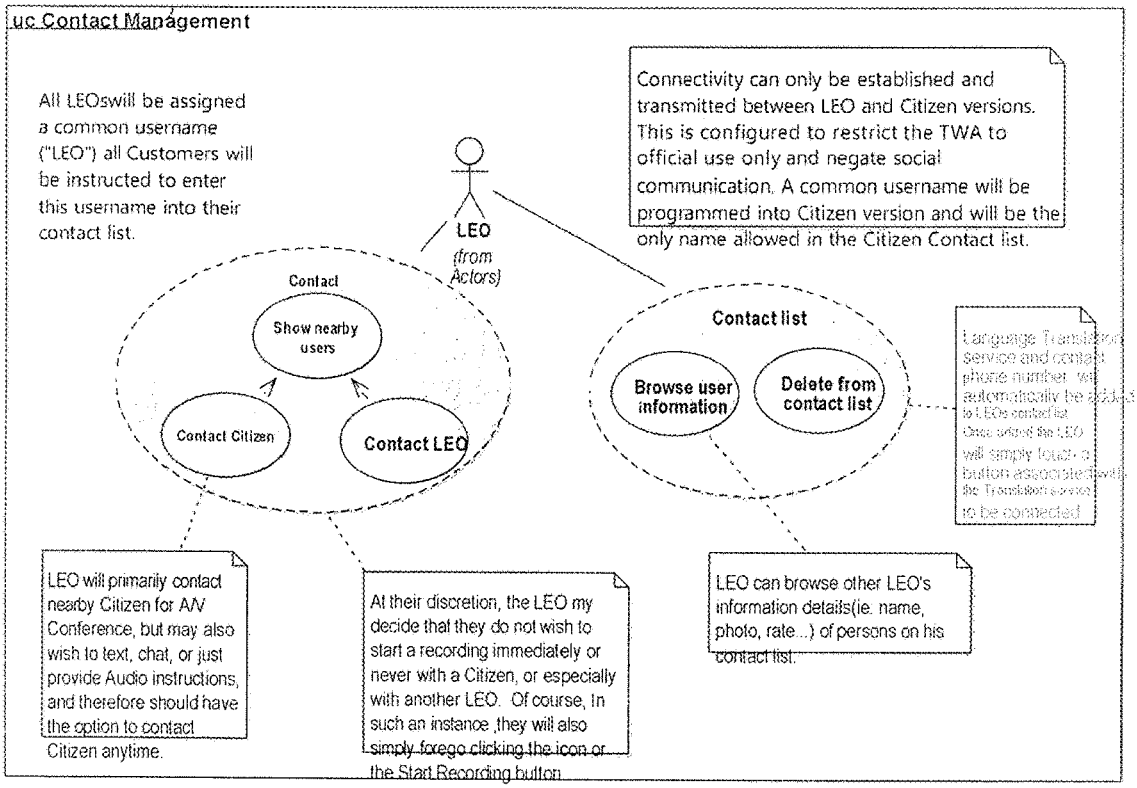
FIGS. 11-23 are diagrammatic illustrations/block diagrams and elevational views of the user interfaces showing the contact management.
Figure 12:
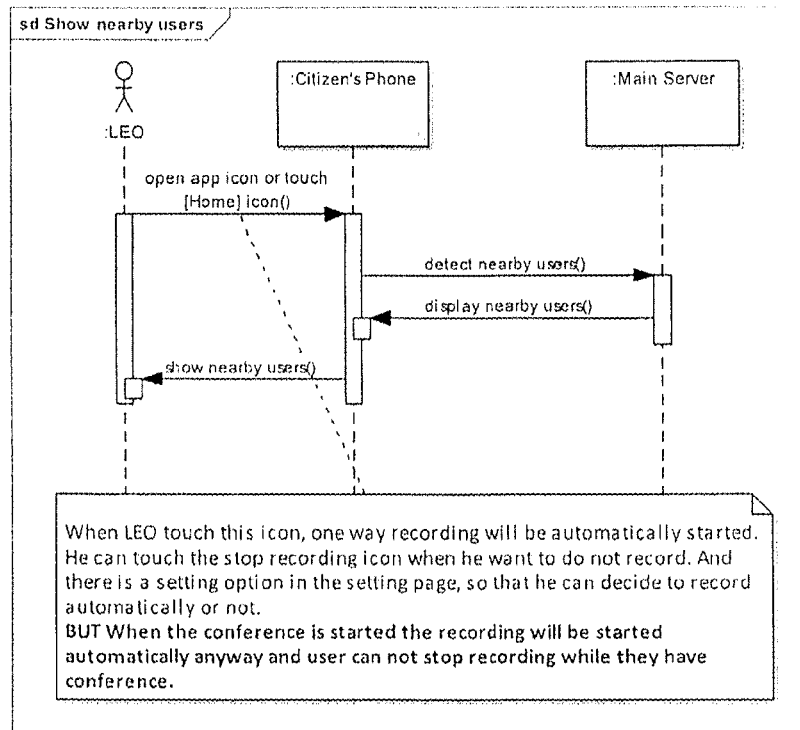
Figure 13:
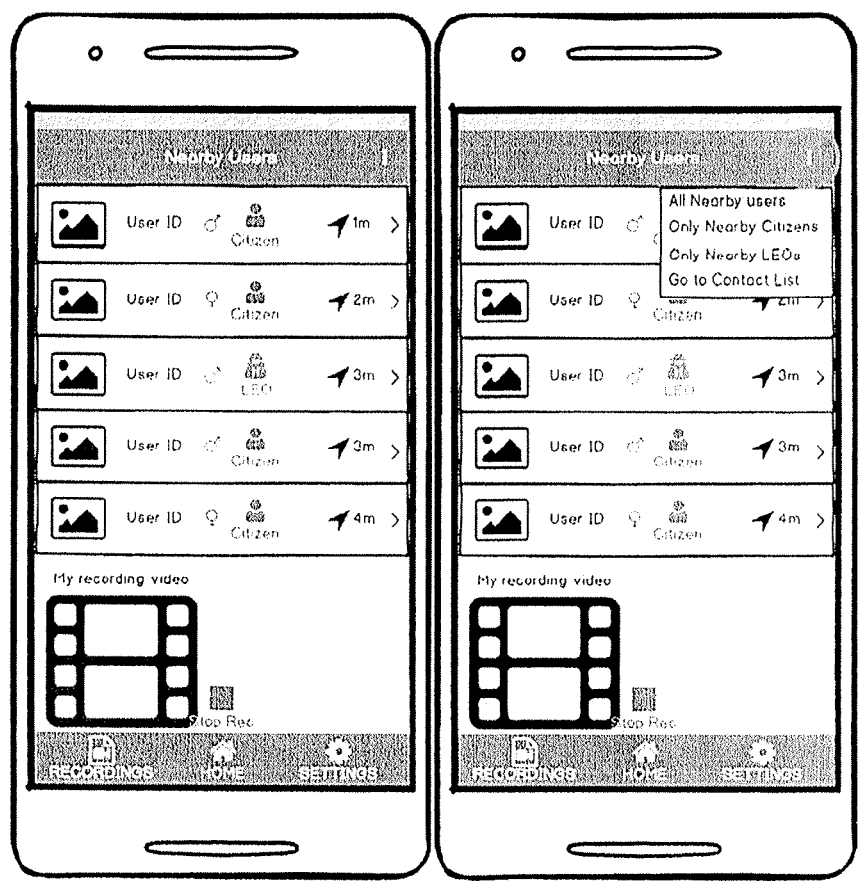
Figure 14:
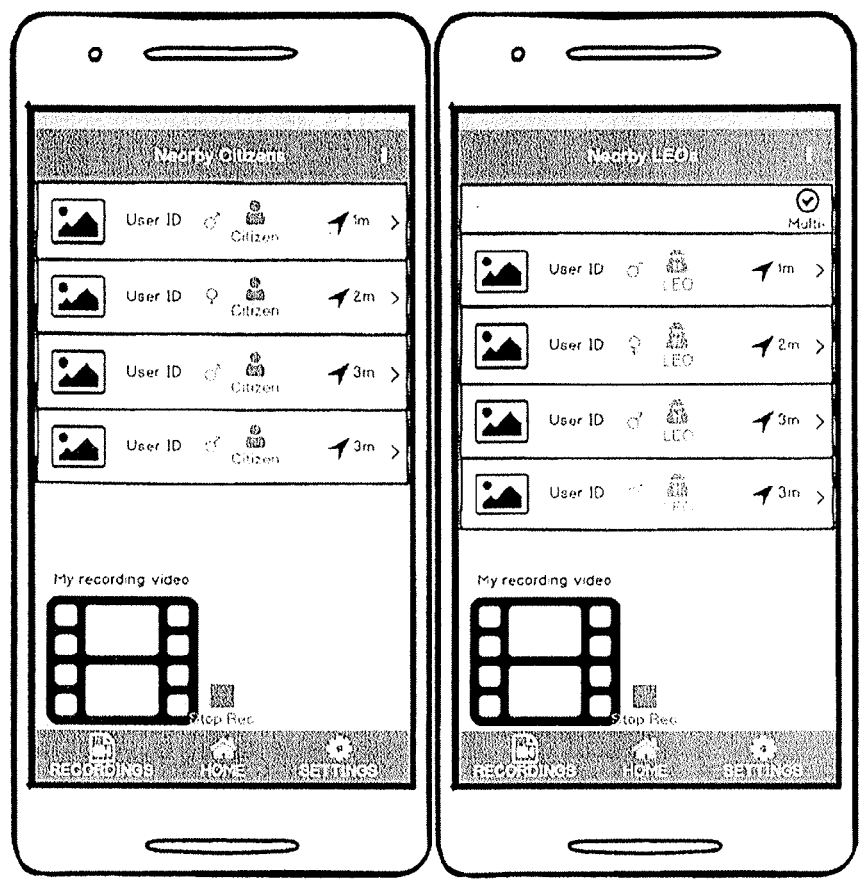
Figure 15:
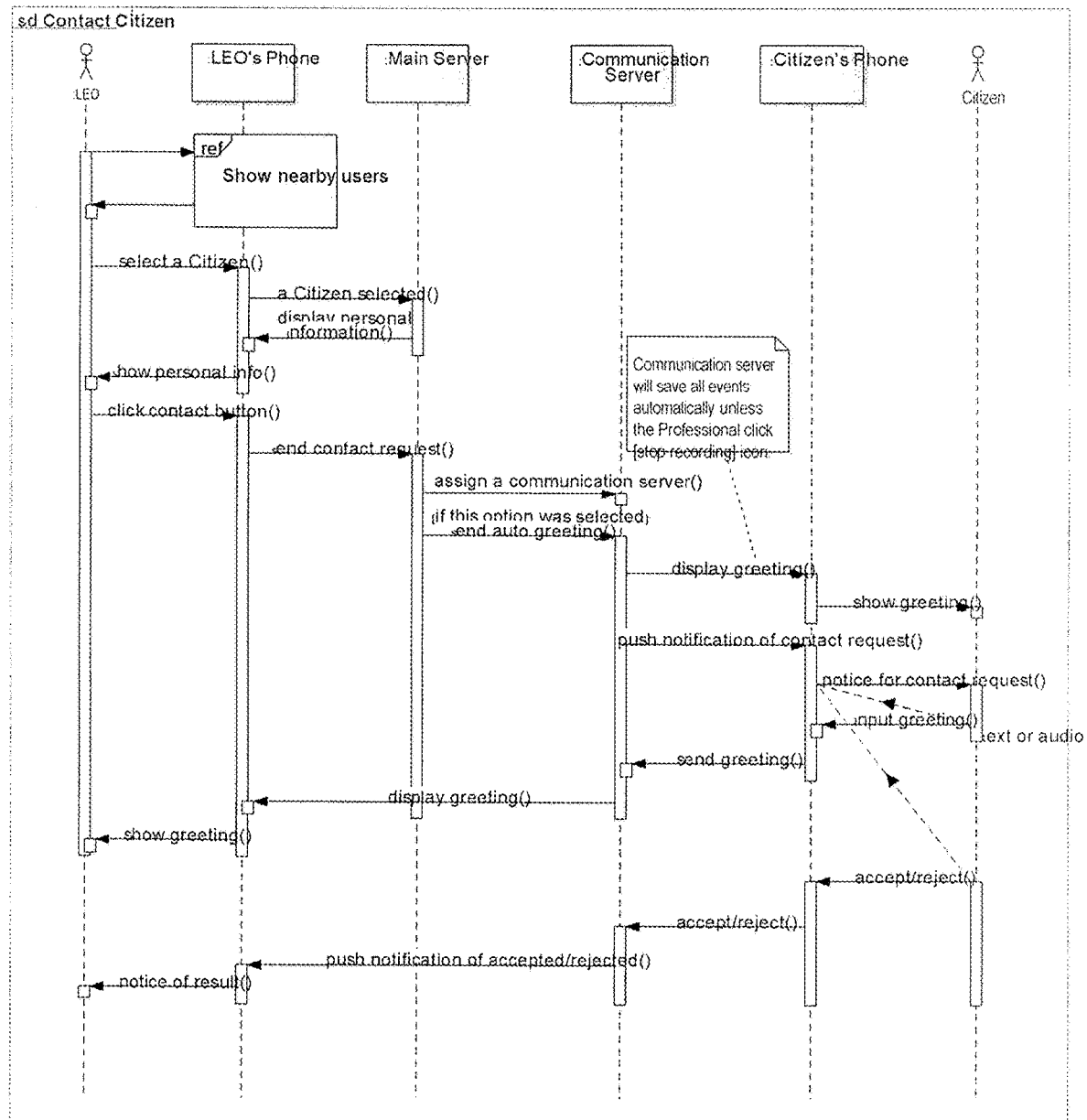
Figure 16:
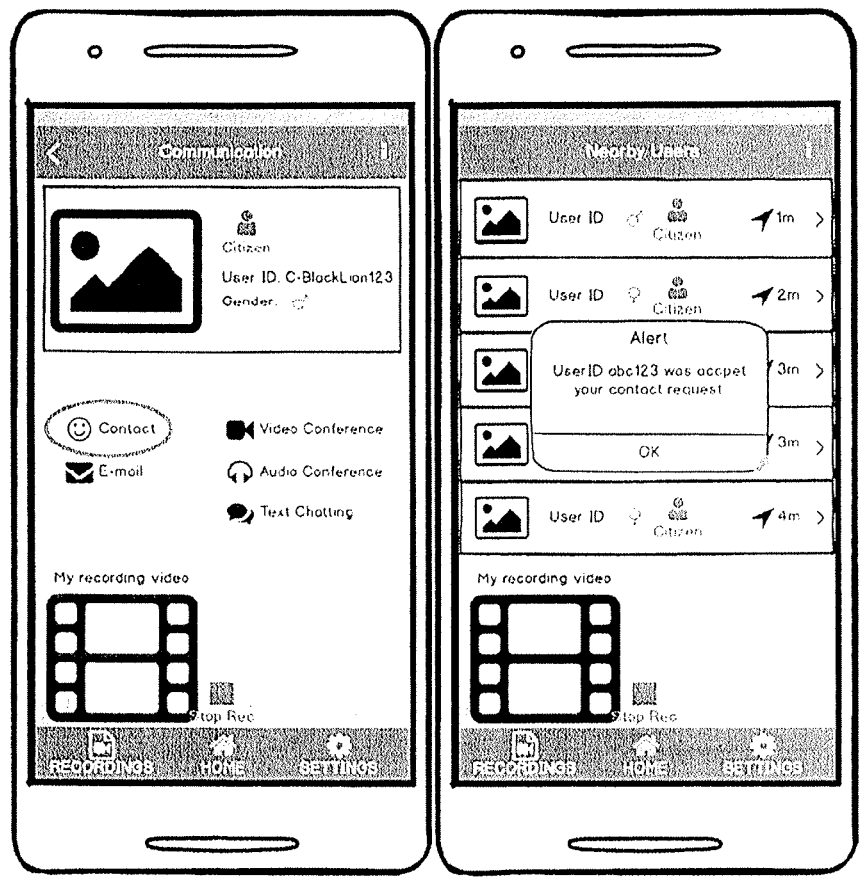
Figure 17:
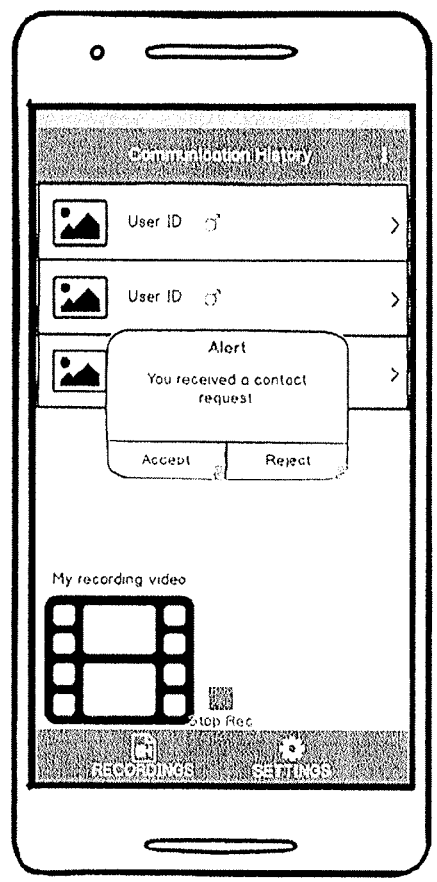
Figure 18:
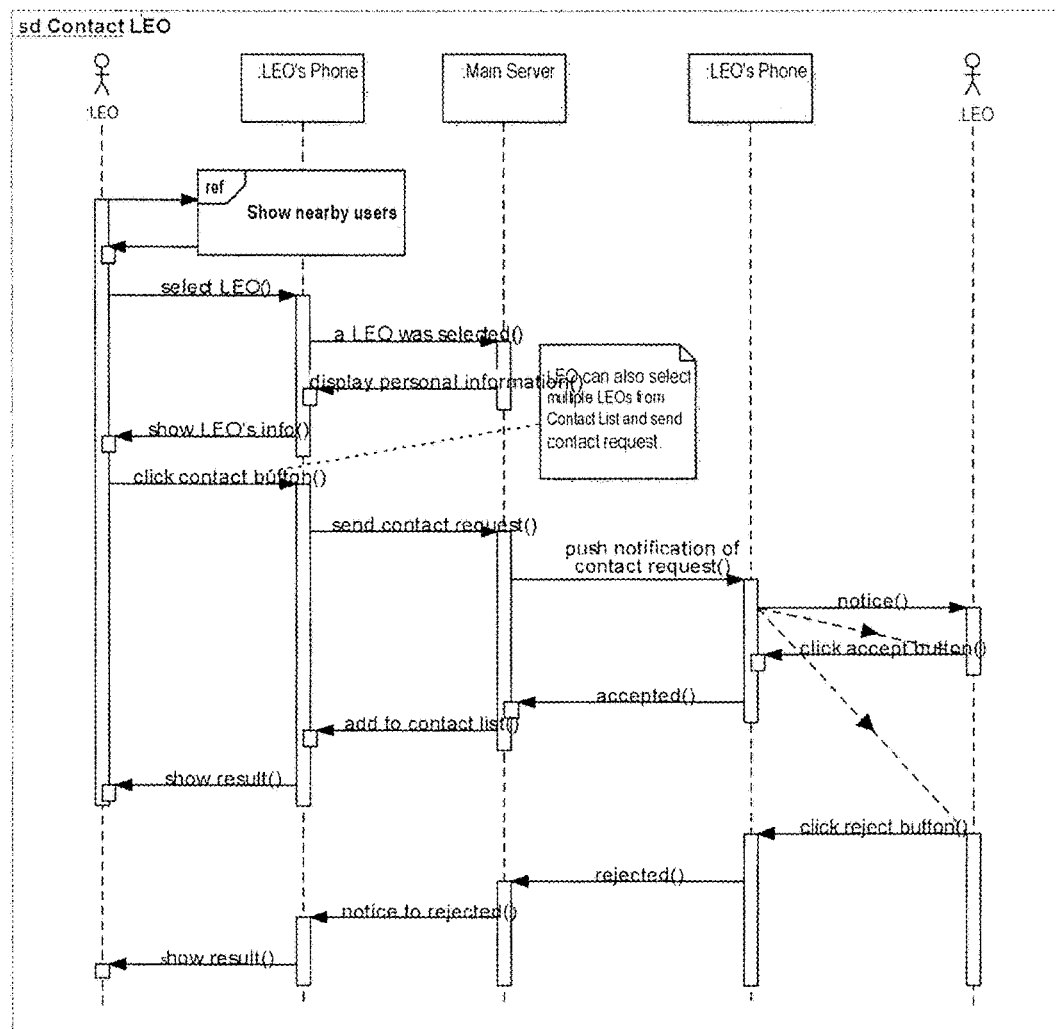
Figure 19:
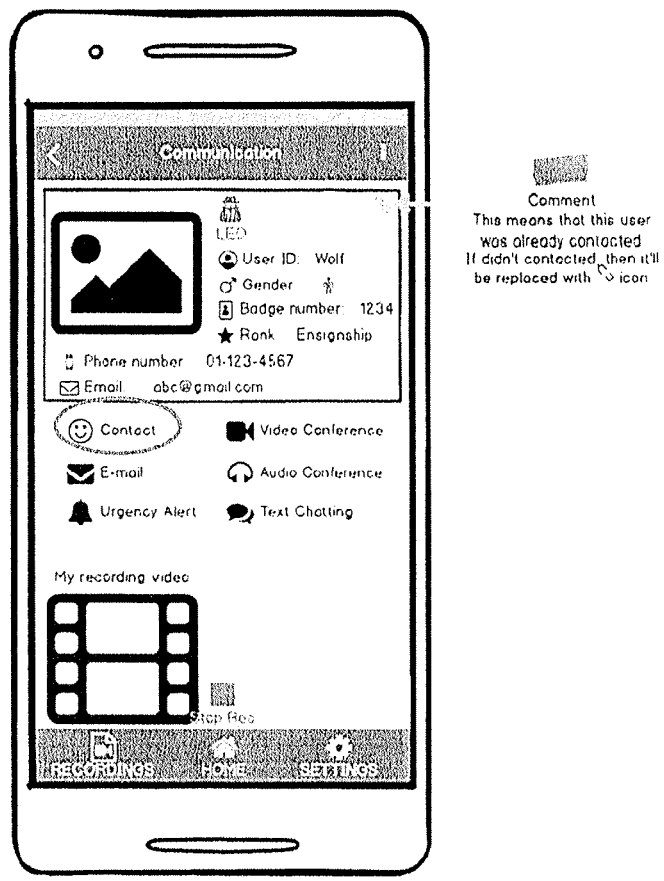
Figure 20:
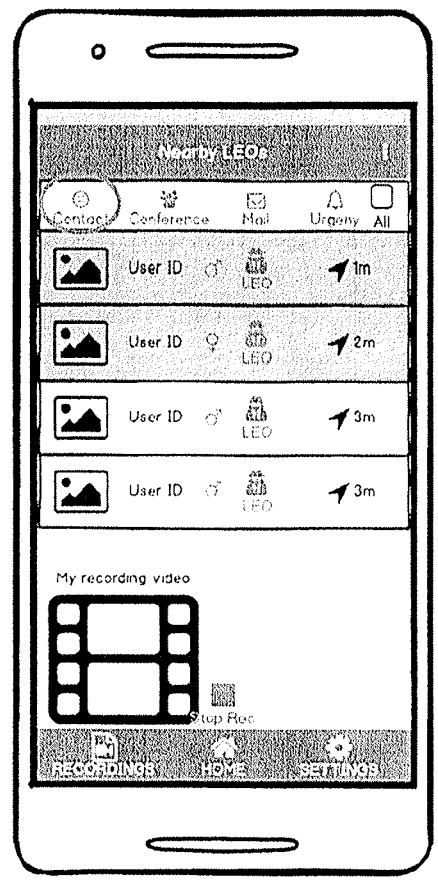
Figure 20:
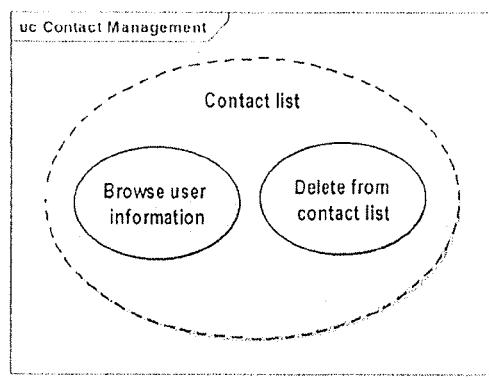
Figure 21:
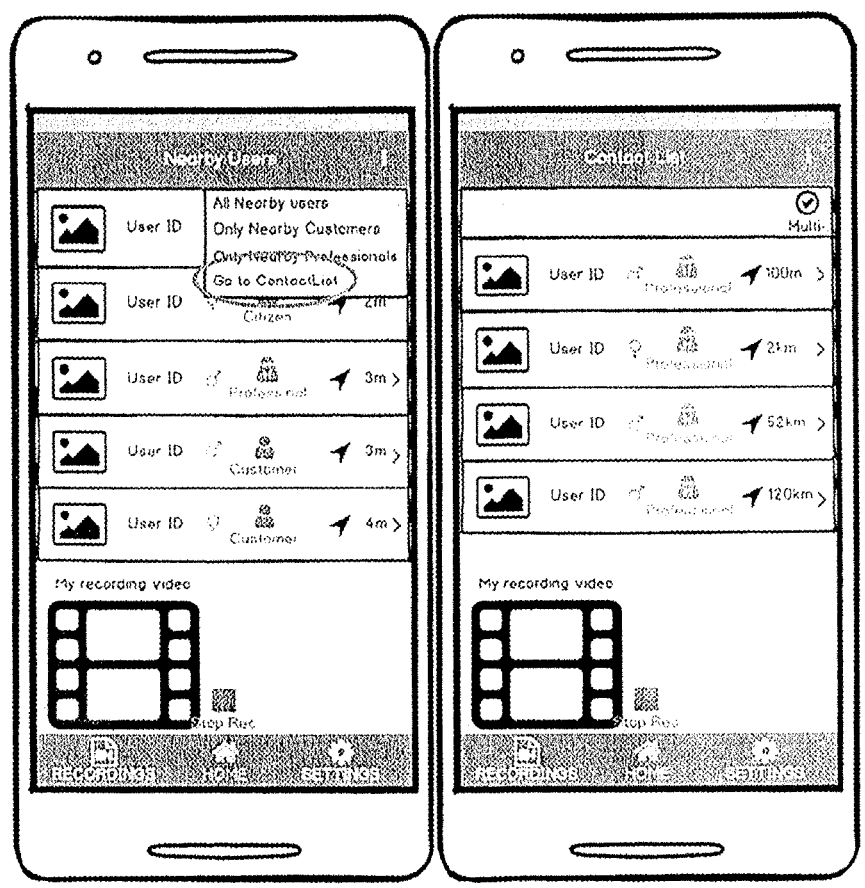
Figure 22:
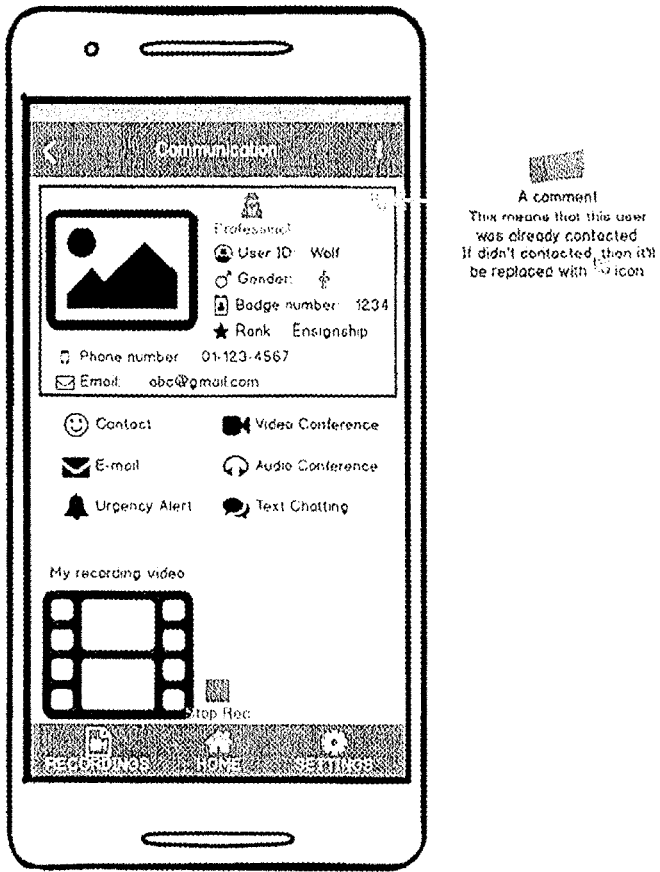
Figure 23:
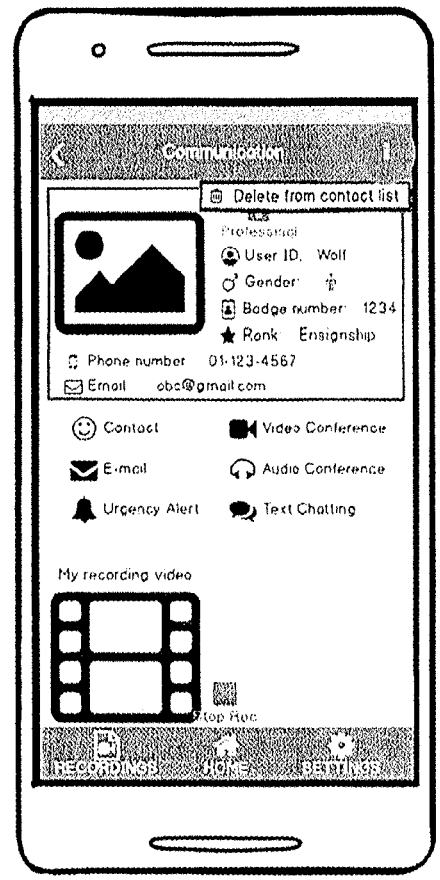
Figure 24:
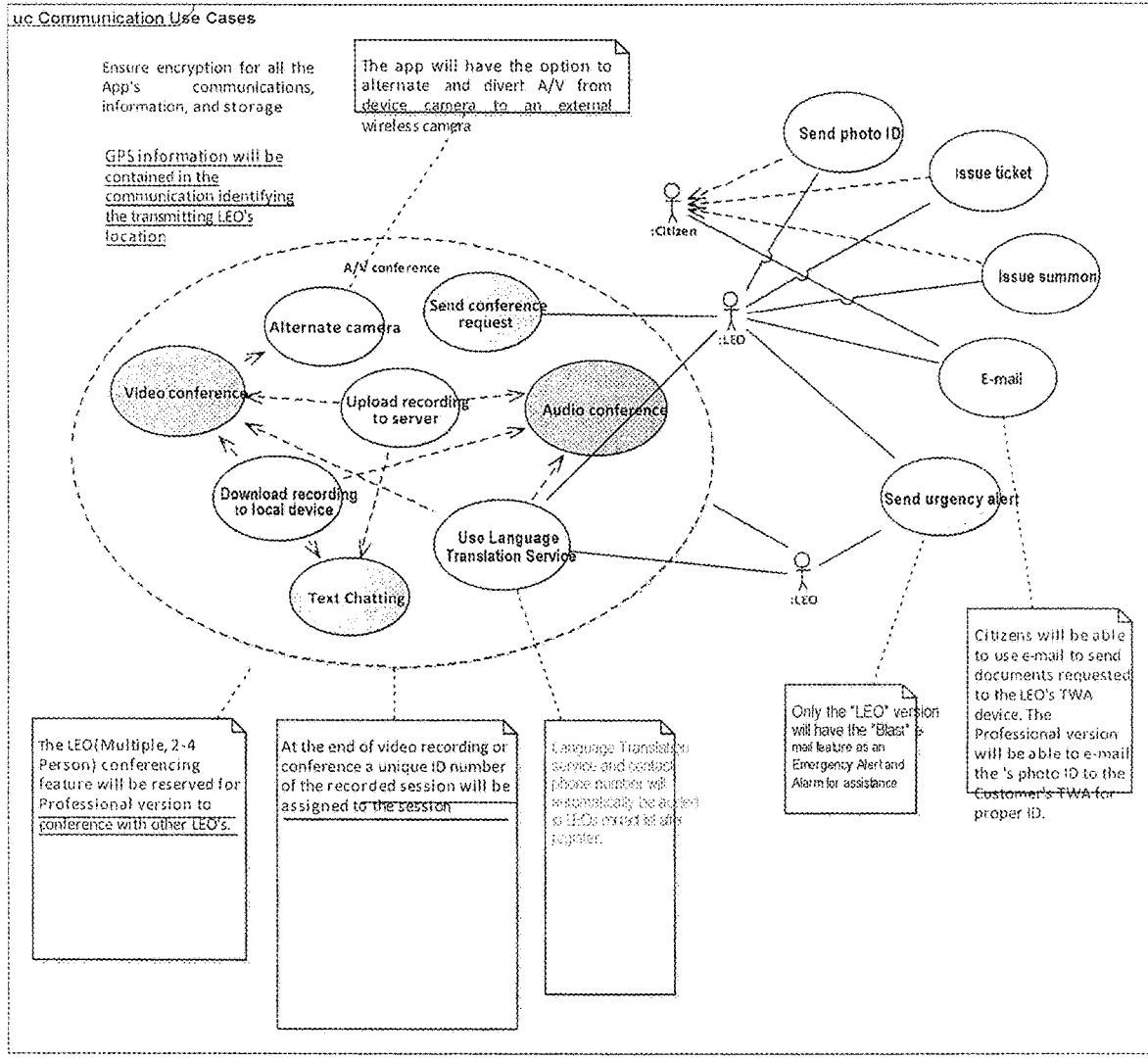
FIGS. 24-41 are diagrammatic illustrations/block diagrams and elevational views of the communication process and task performance process.
Figure 25:
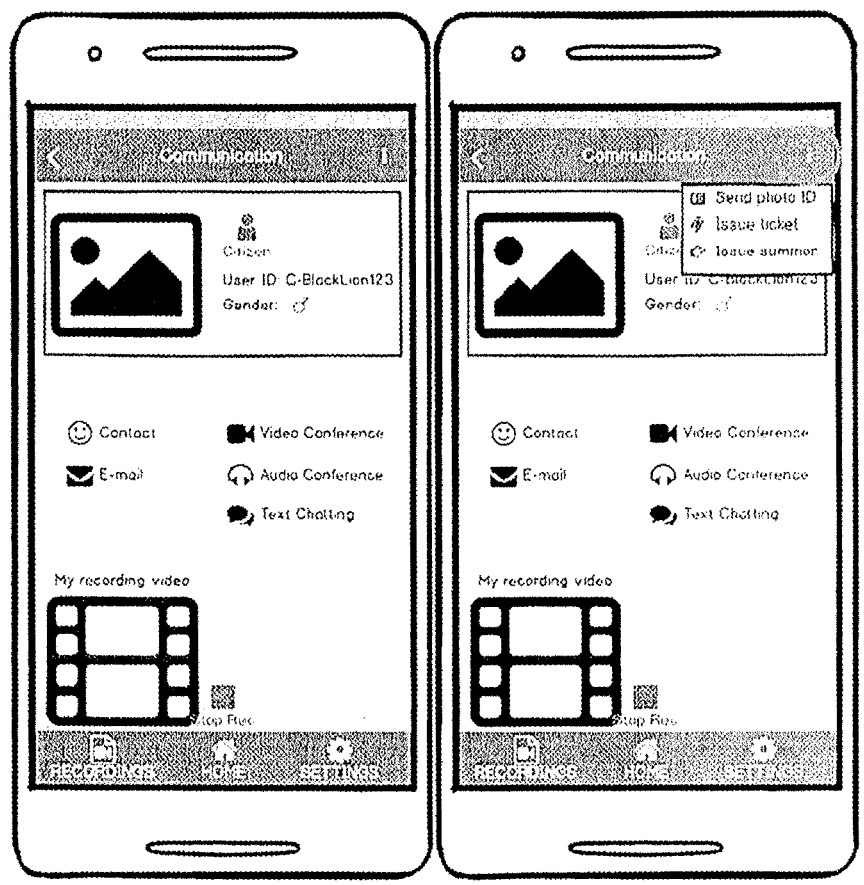
Figure 26:
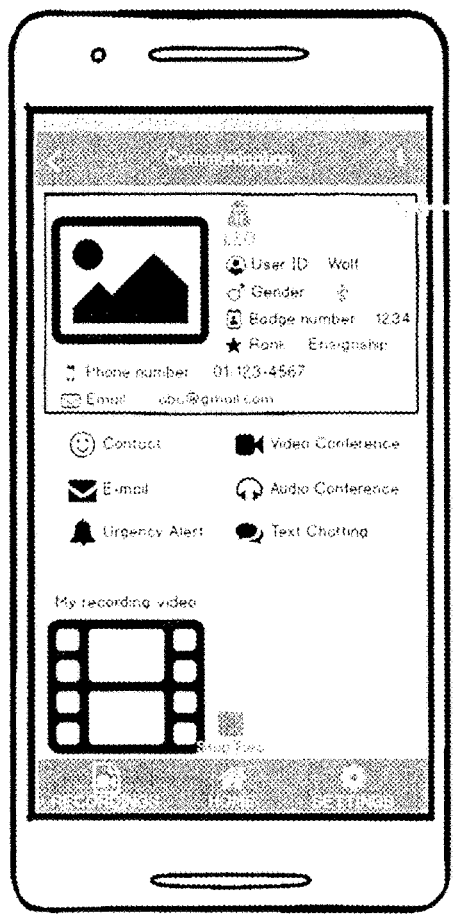
Figure 26:
Figure 26:
Figure 26:
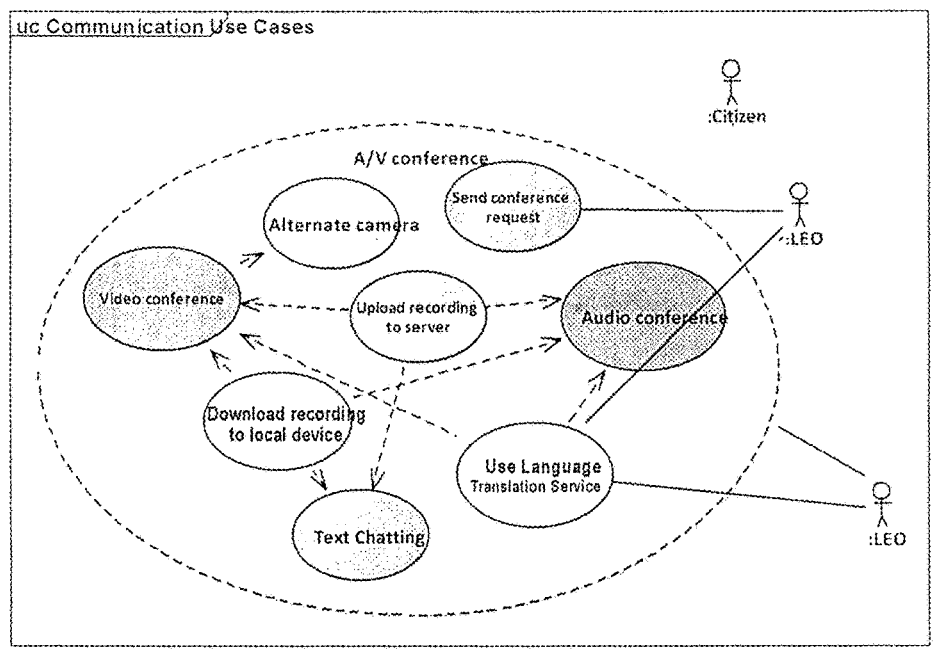
Figure 27:
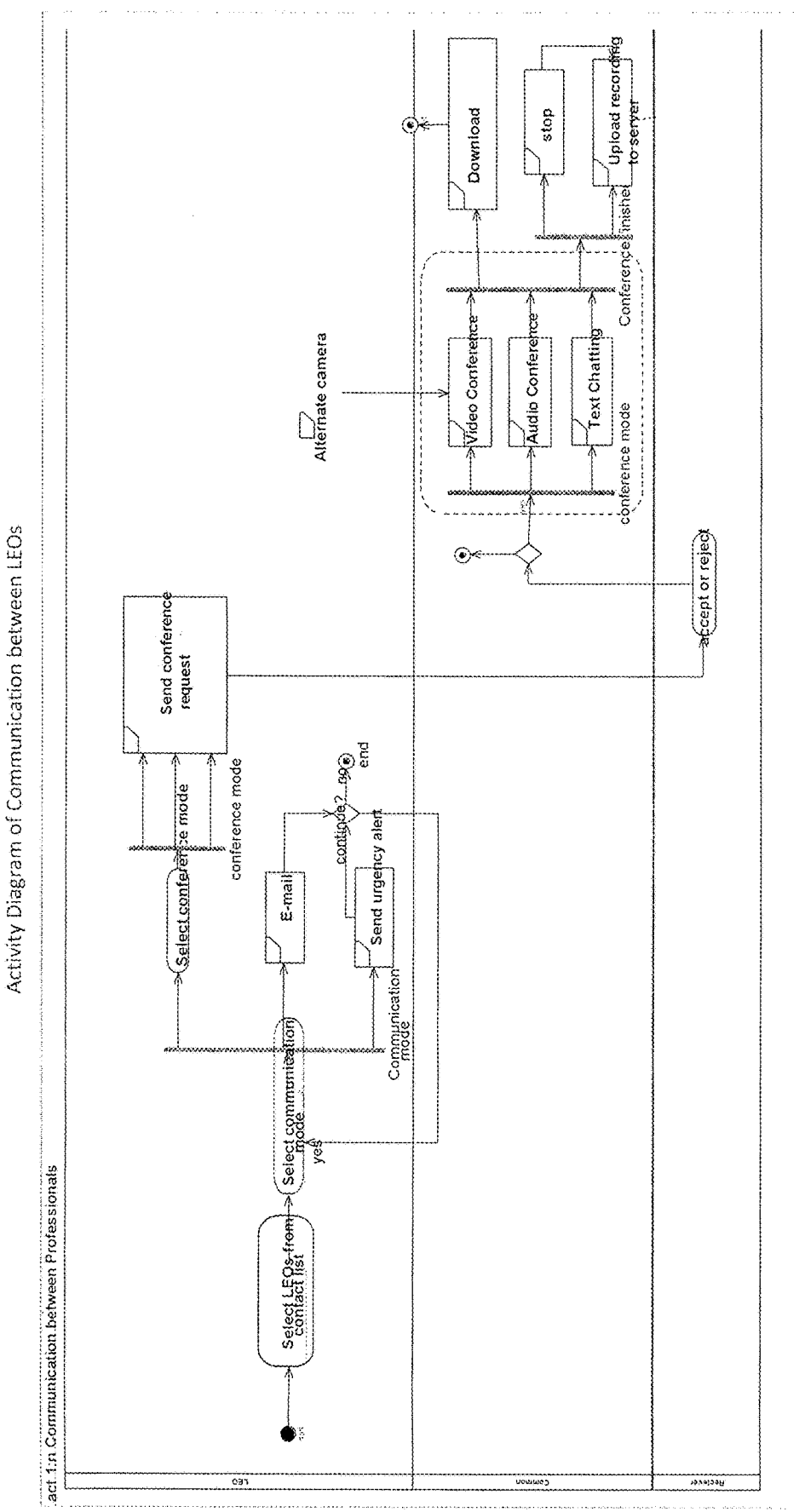
Figure 28:
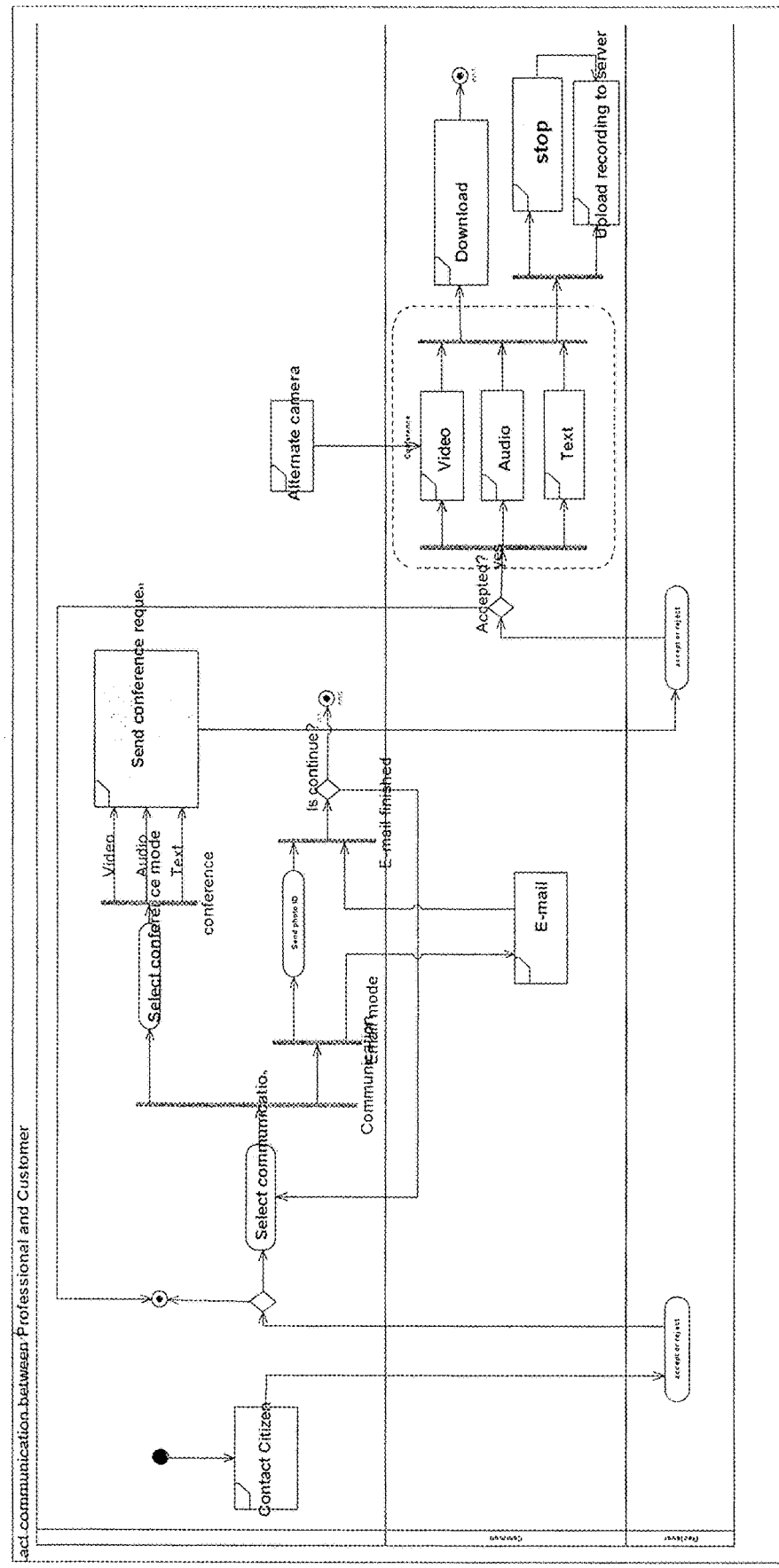
Figure 29:
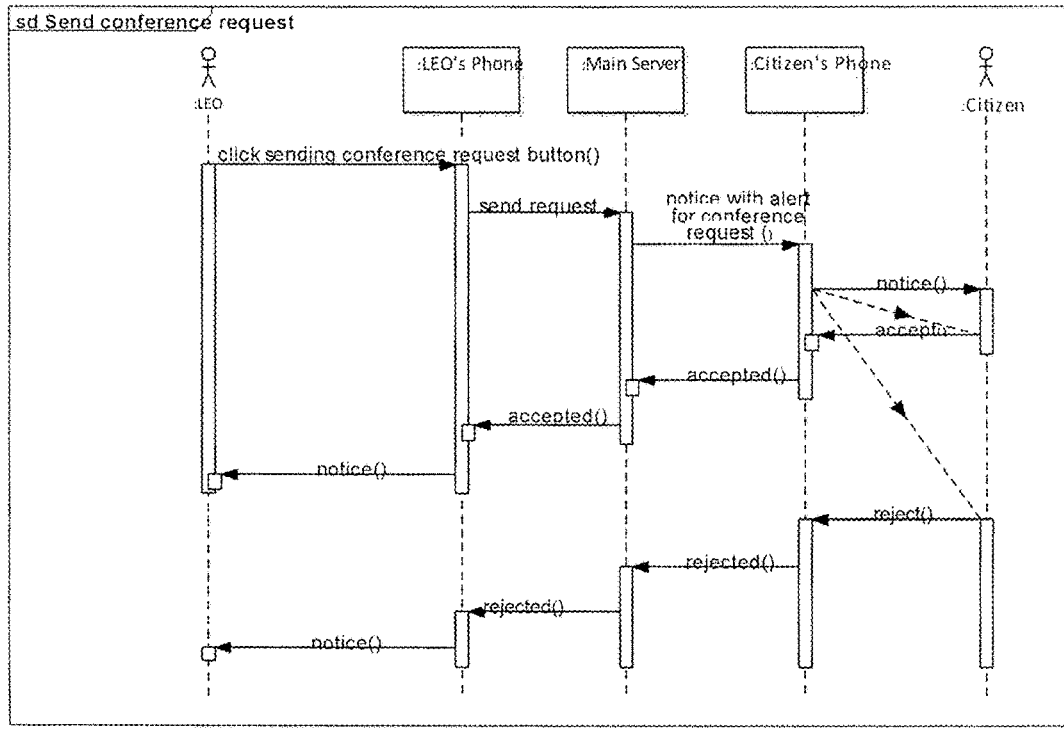
Figure 29:
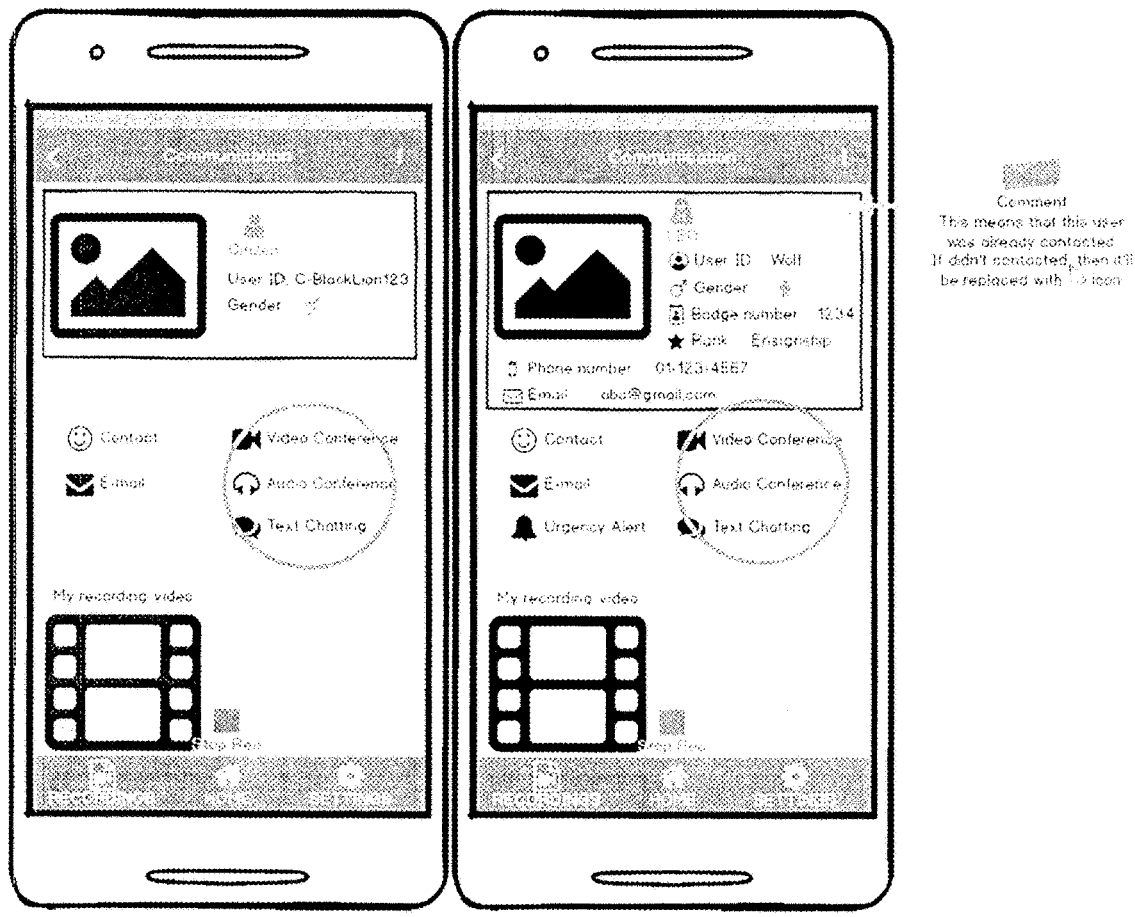
Figure 30:
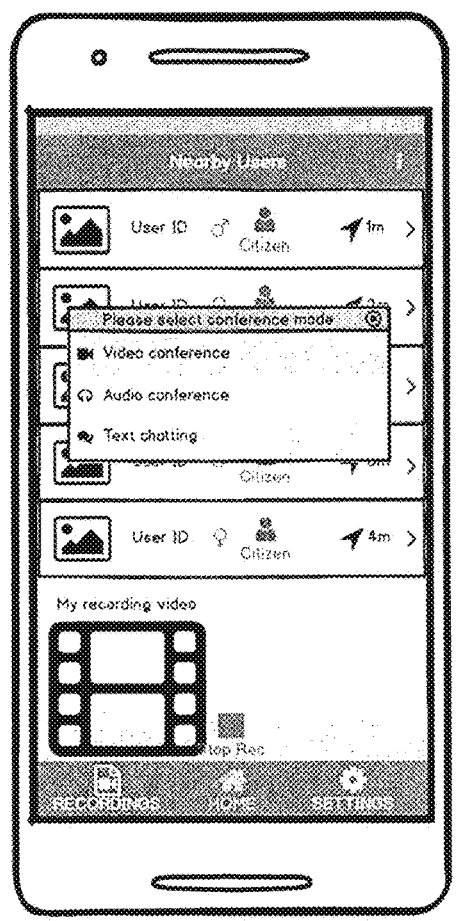
Figure 31:
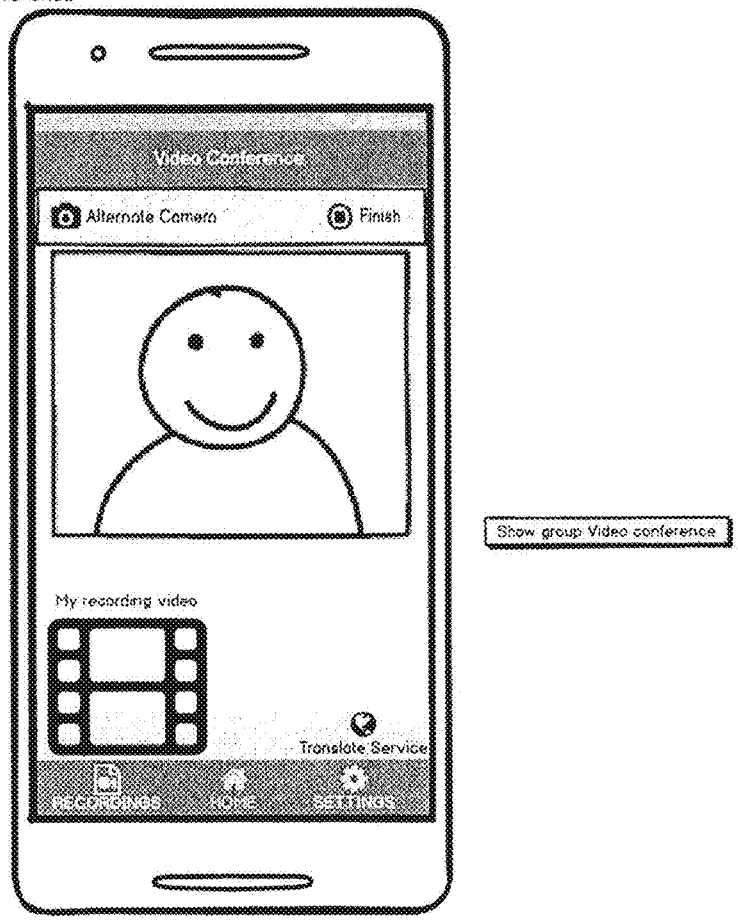
Figure 32:
Figure 33:
Figure 34:
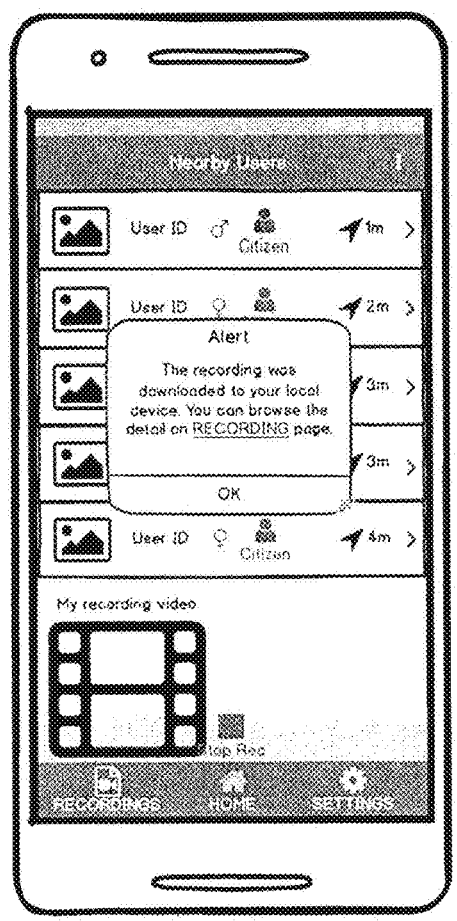
Figure 35:
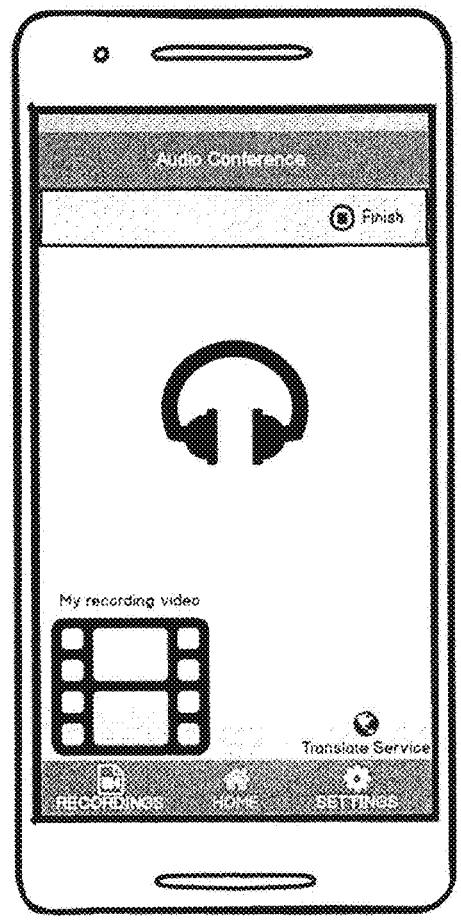
Figure 36:
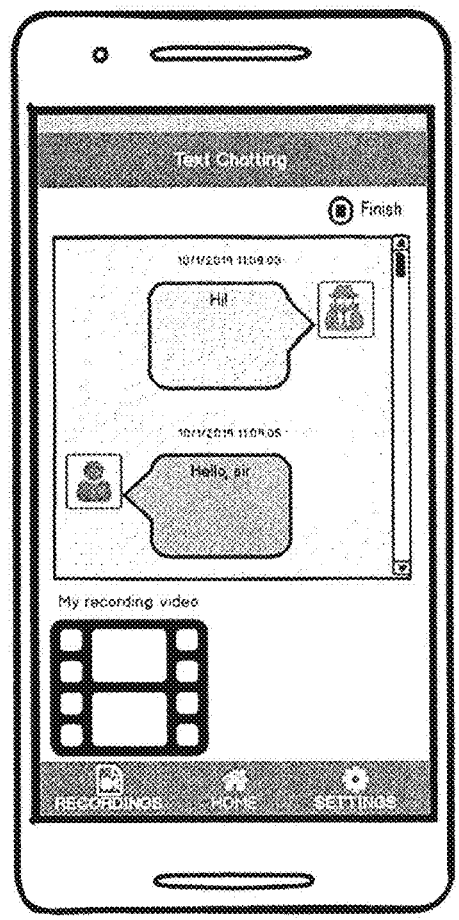
Figure 37:
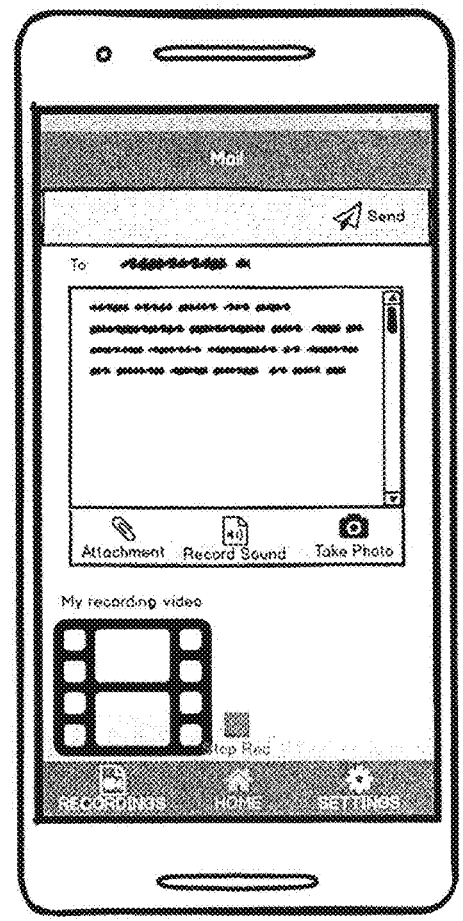
Figure 38:
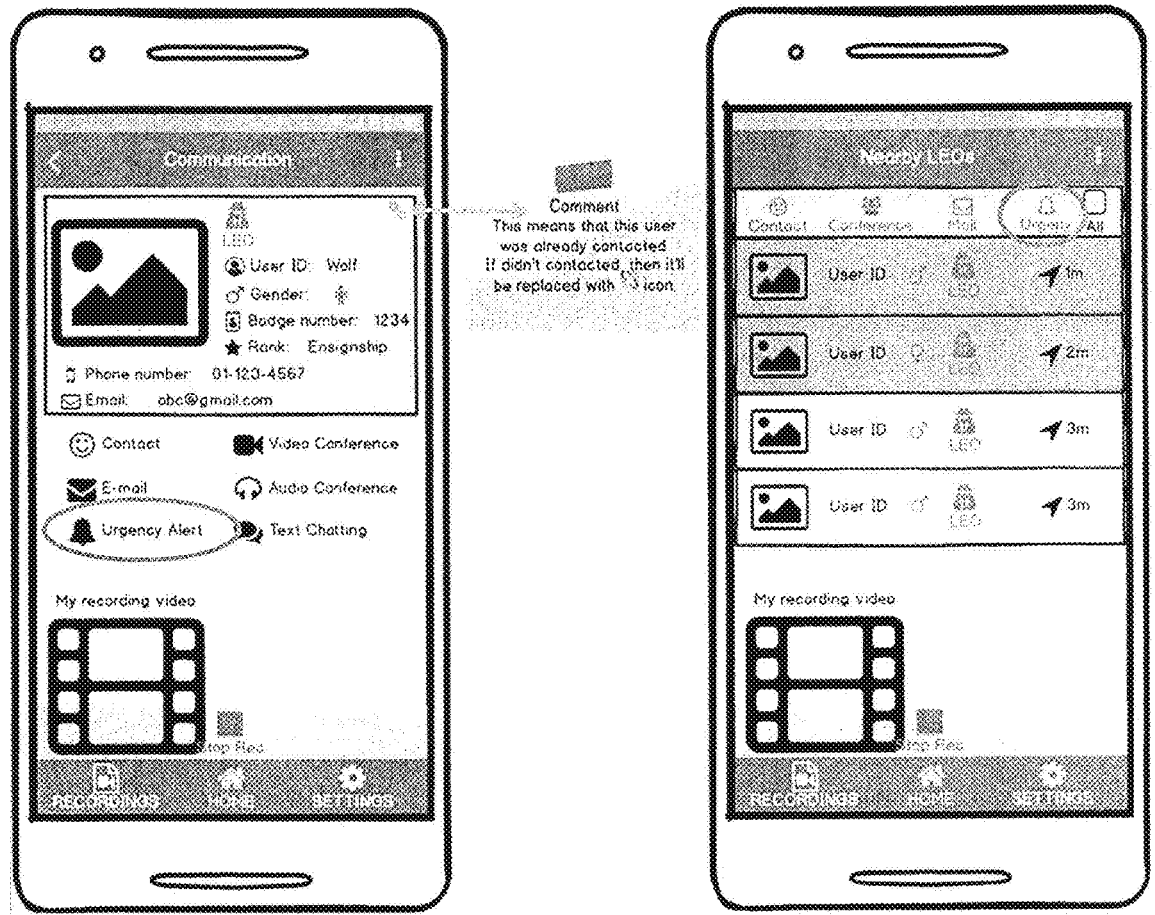
Figure 39:
Figure 40:
Figure 41:
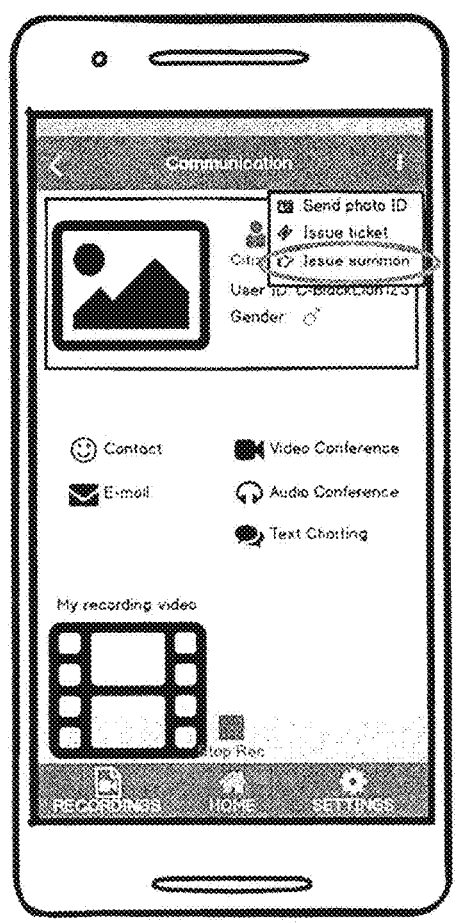
Figure 42:
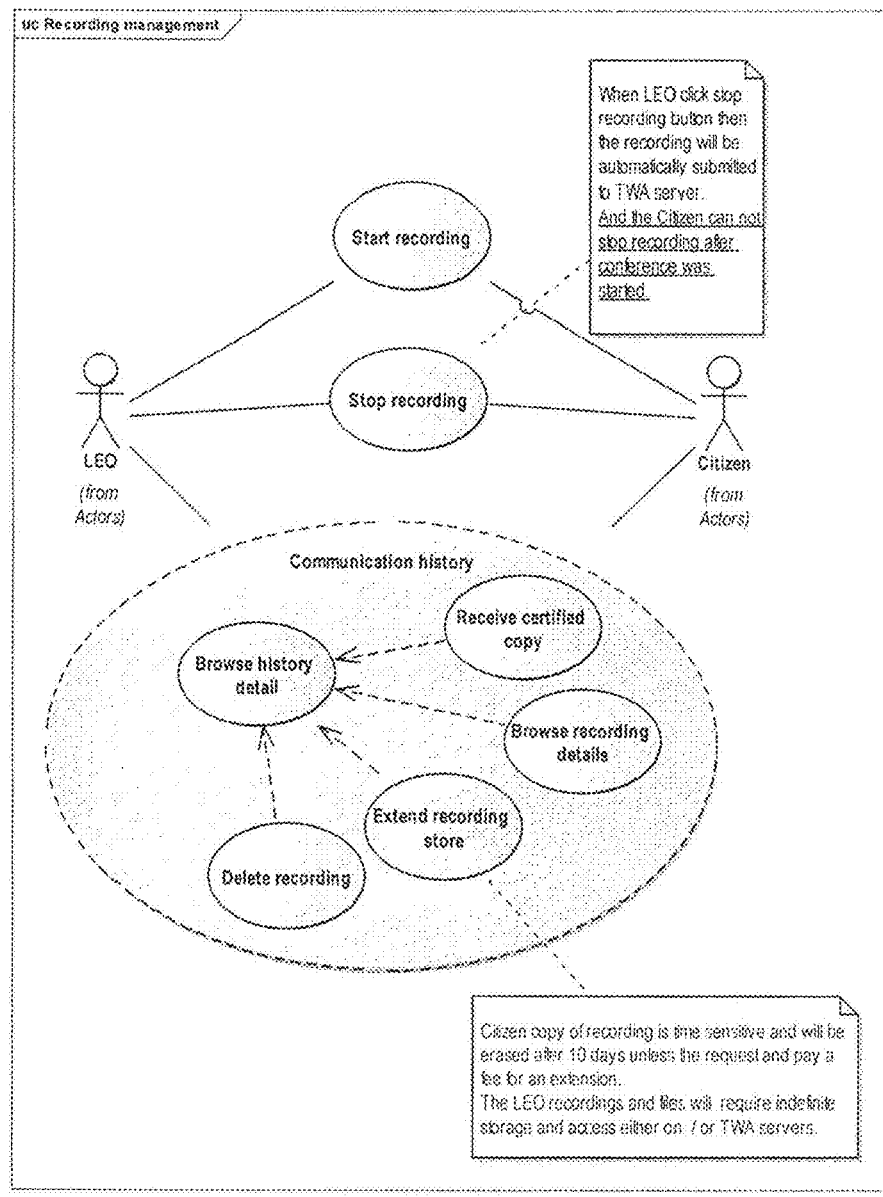
FIGS. 42-63 are diagrammatic illustrations/block diagrams and elevational views of the recording management process.
Figure 43:
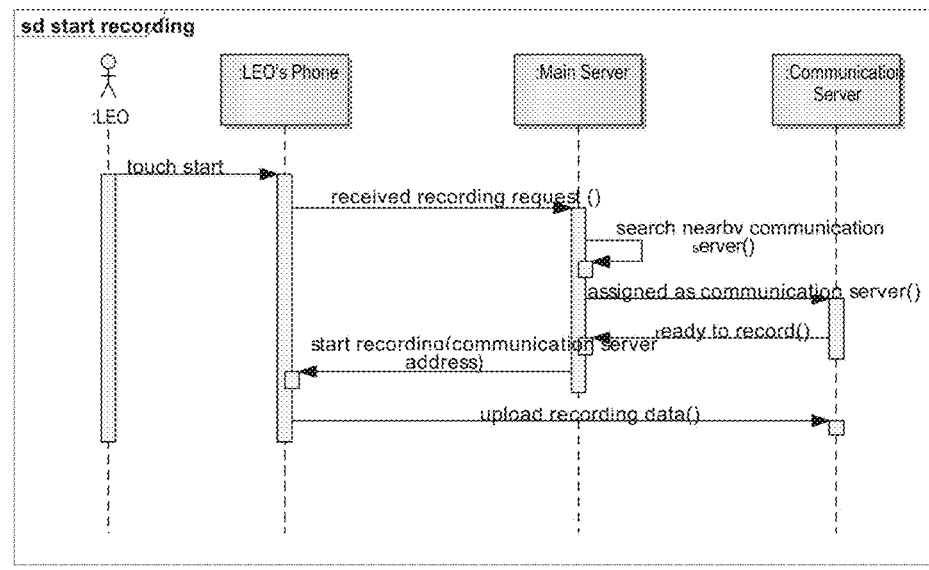
Figure 43:
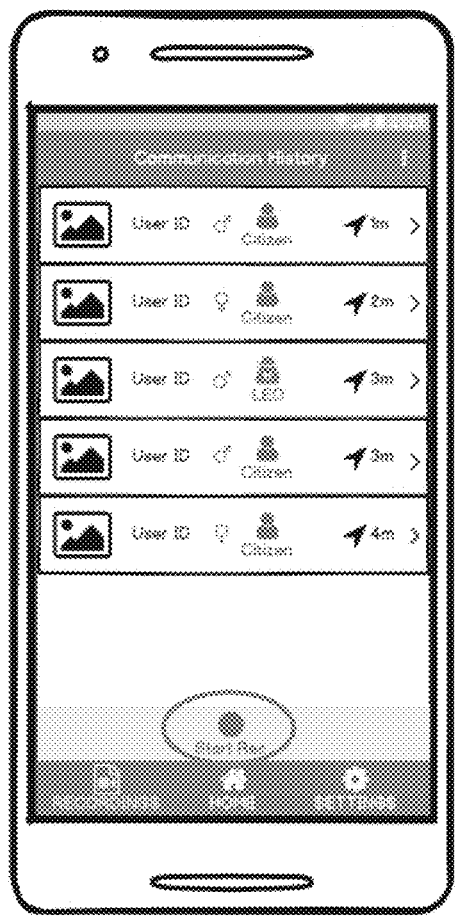
Figure 44:
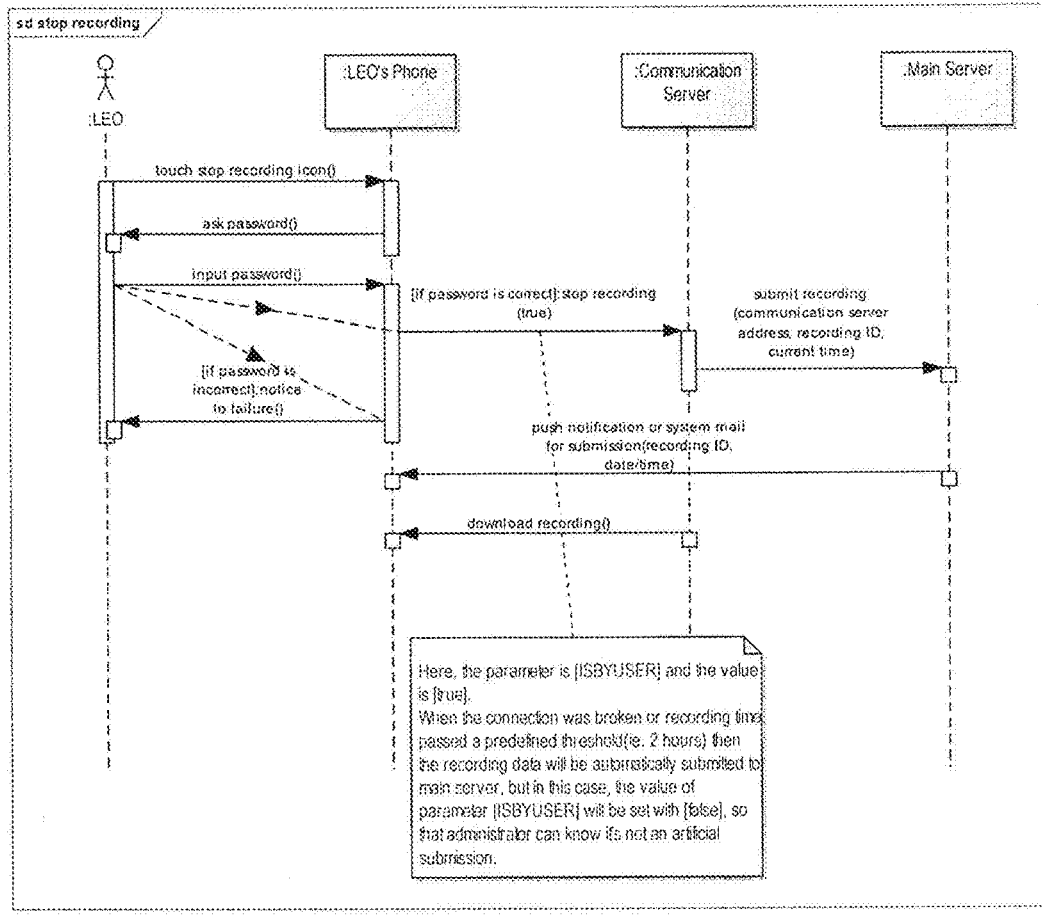
Figure 45:
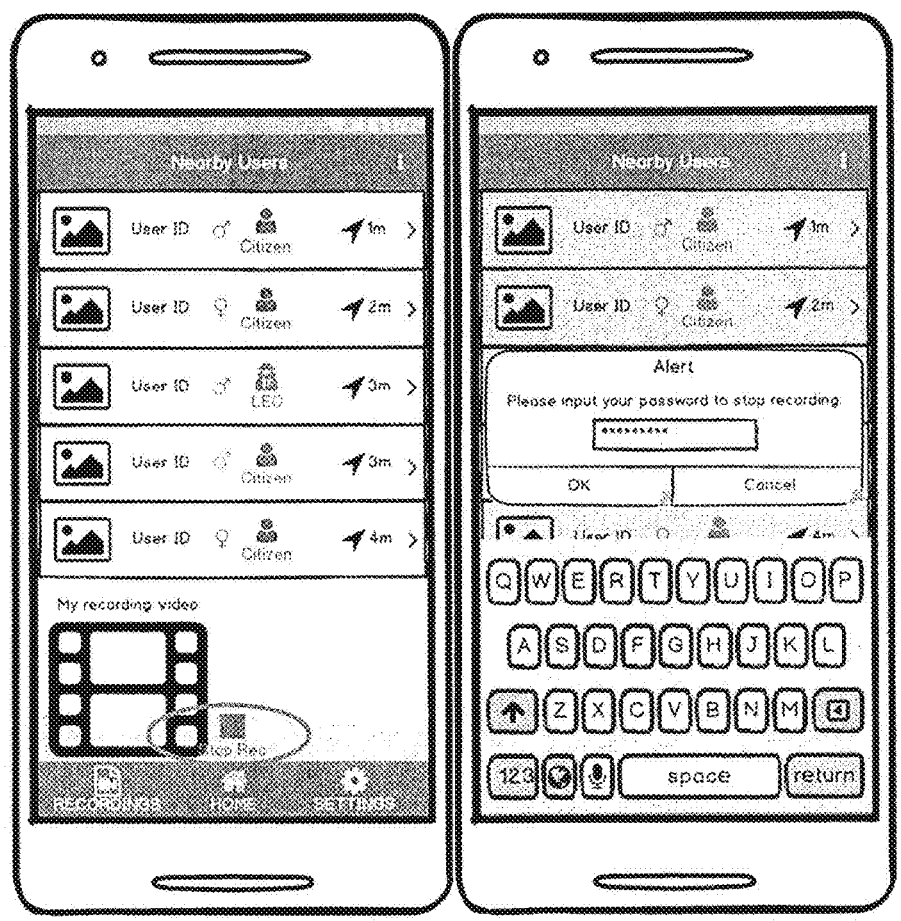
Figure 46:
Figure 47:
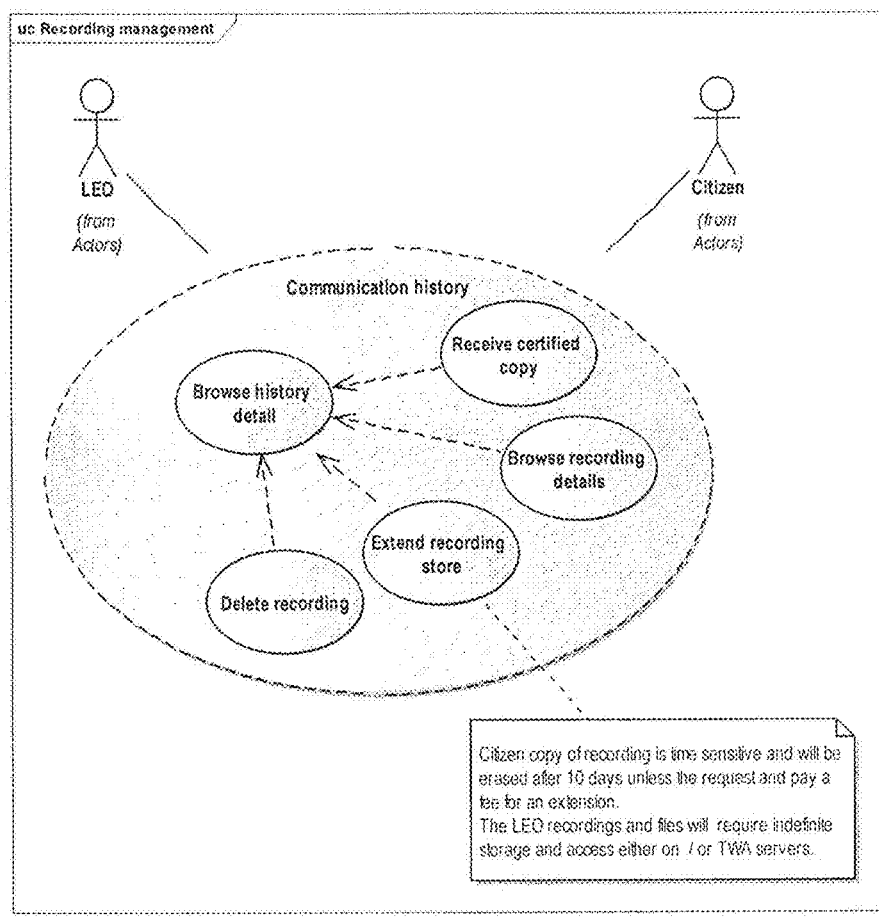
Figure 48:
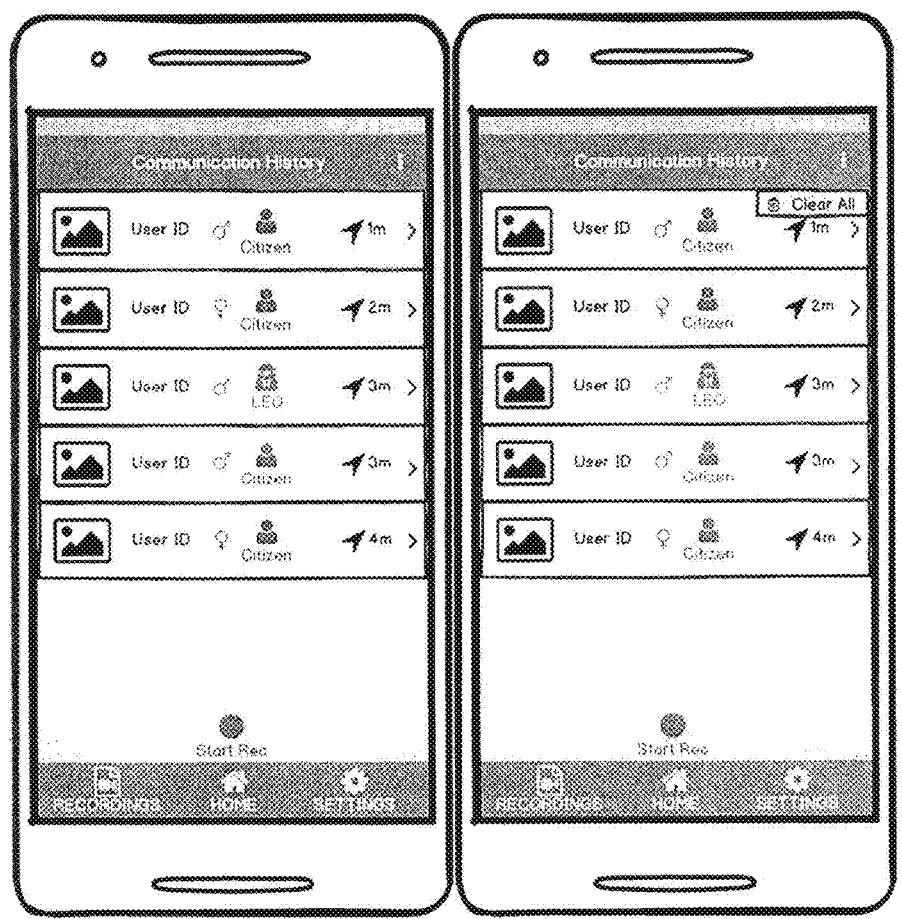
Figure 49:
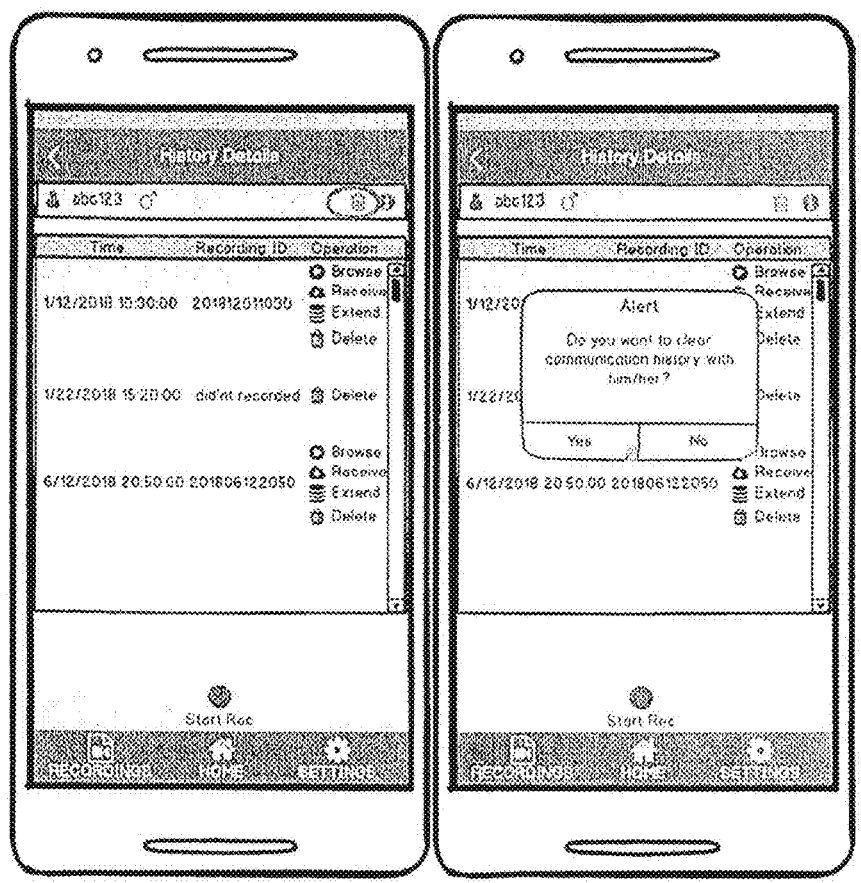
Figure 50:
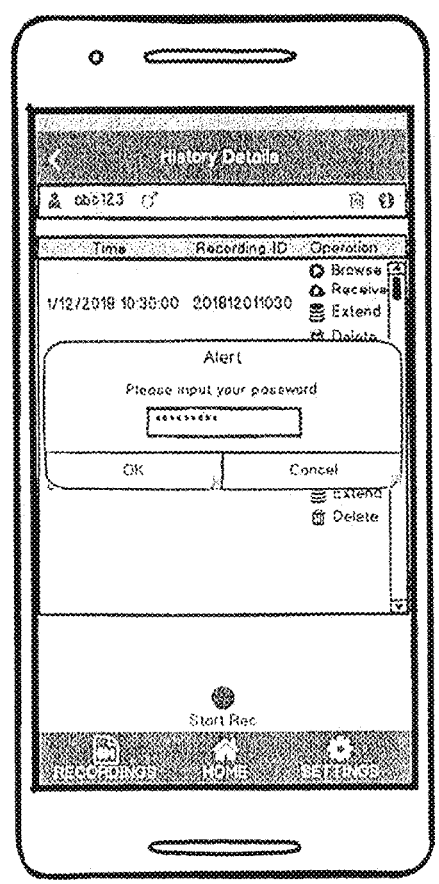
Figure 51:
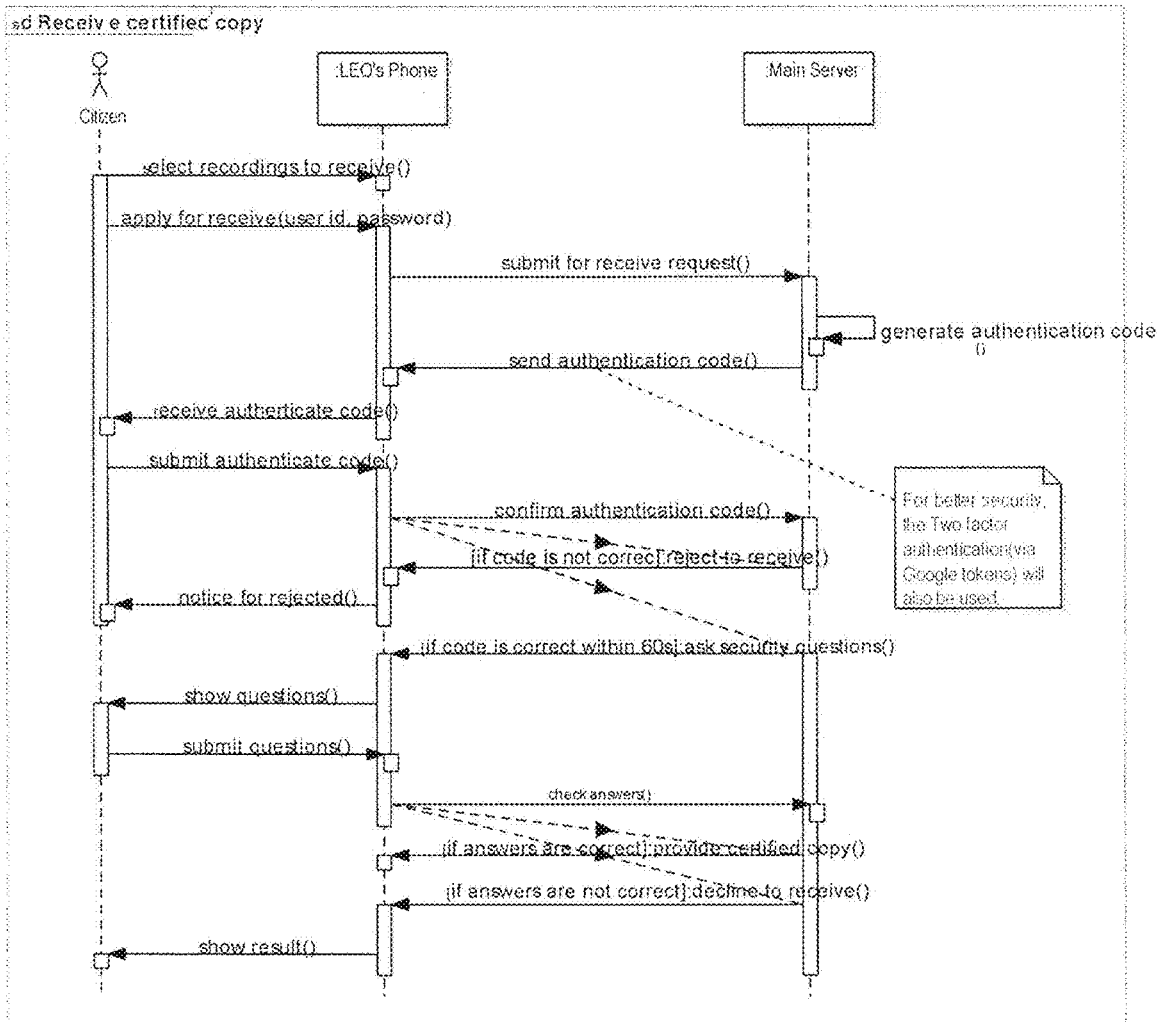
Figure 52:
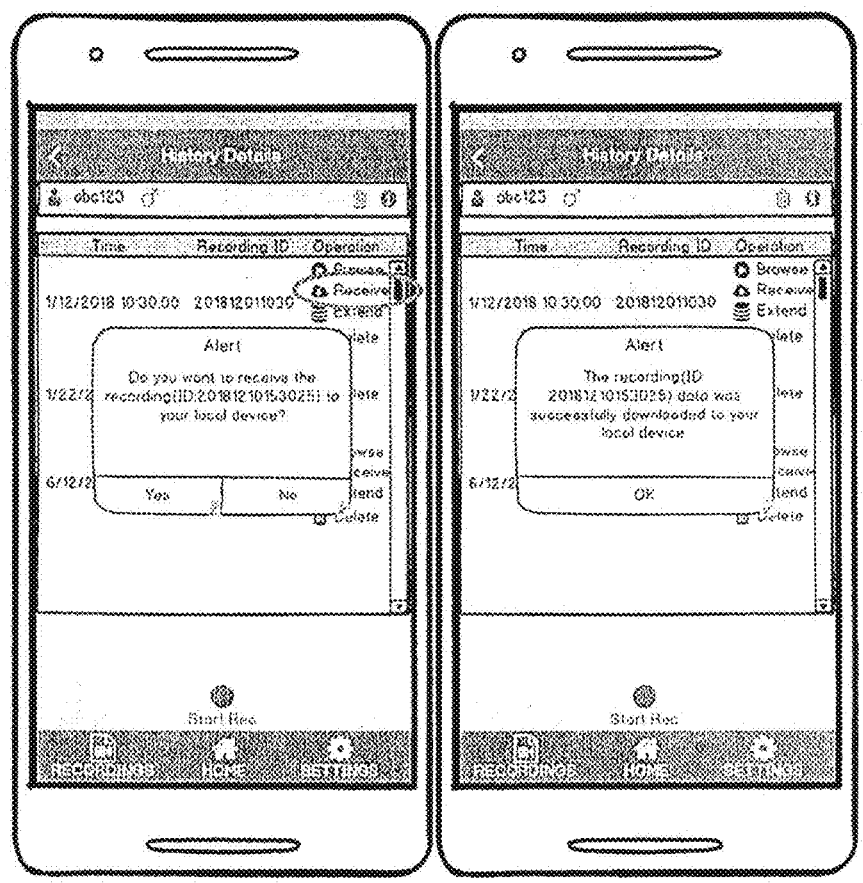
Figure 53:
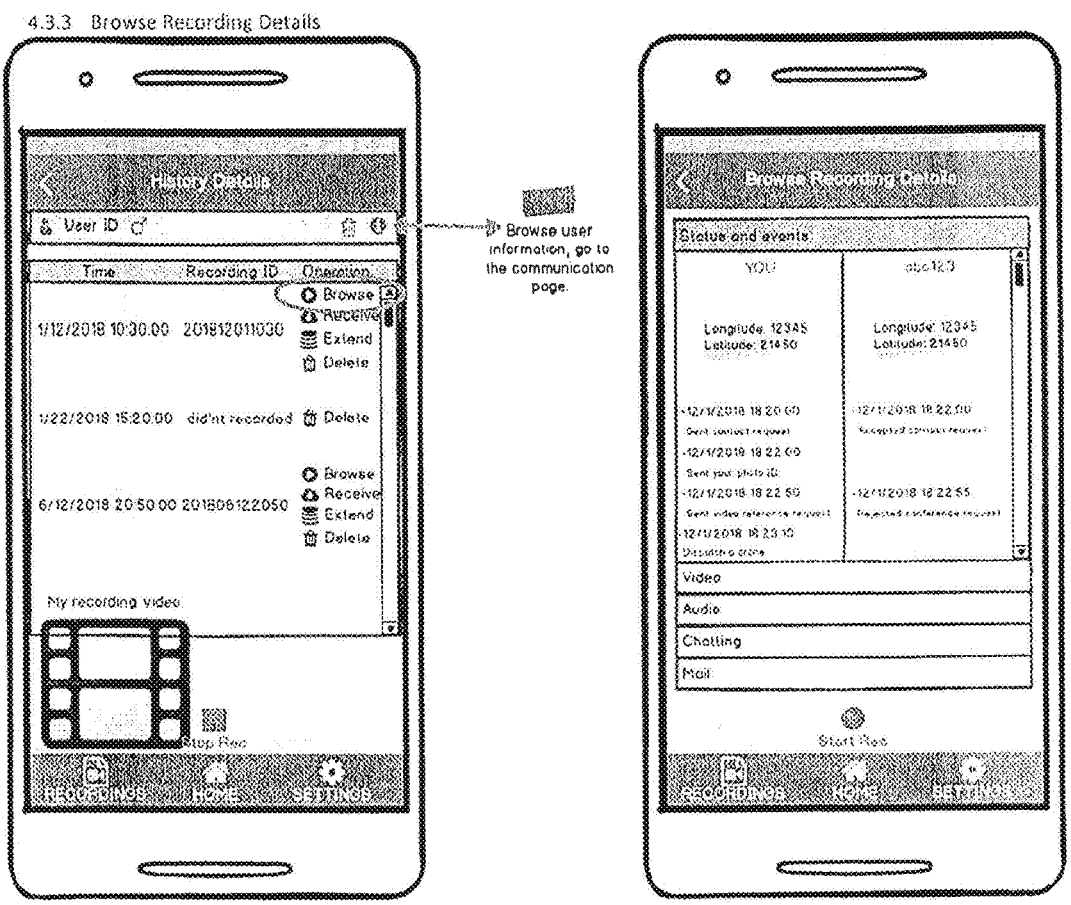
Figure 54:
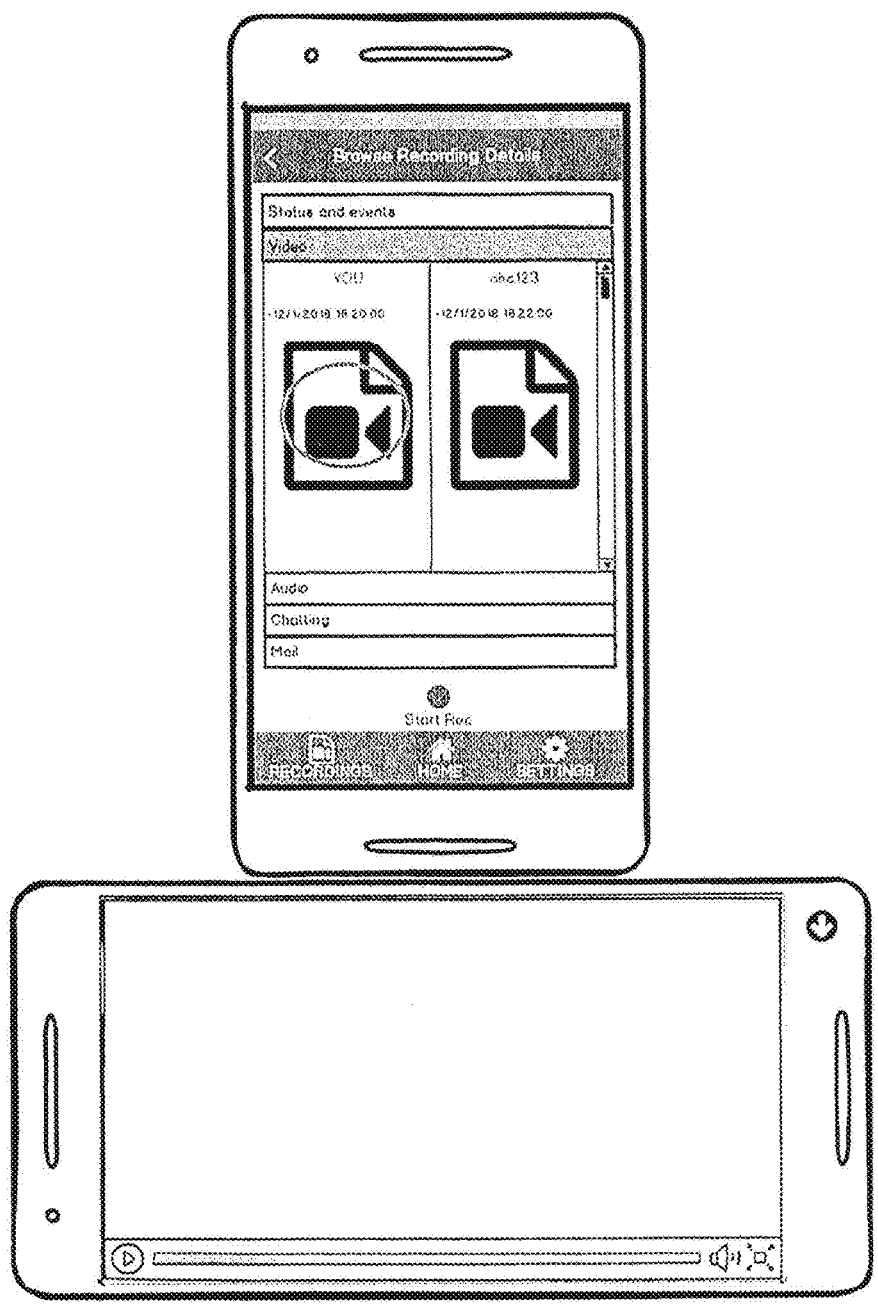
Figure 55:
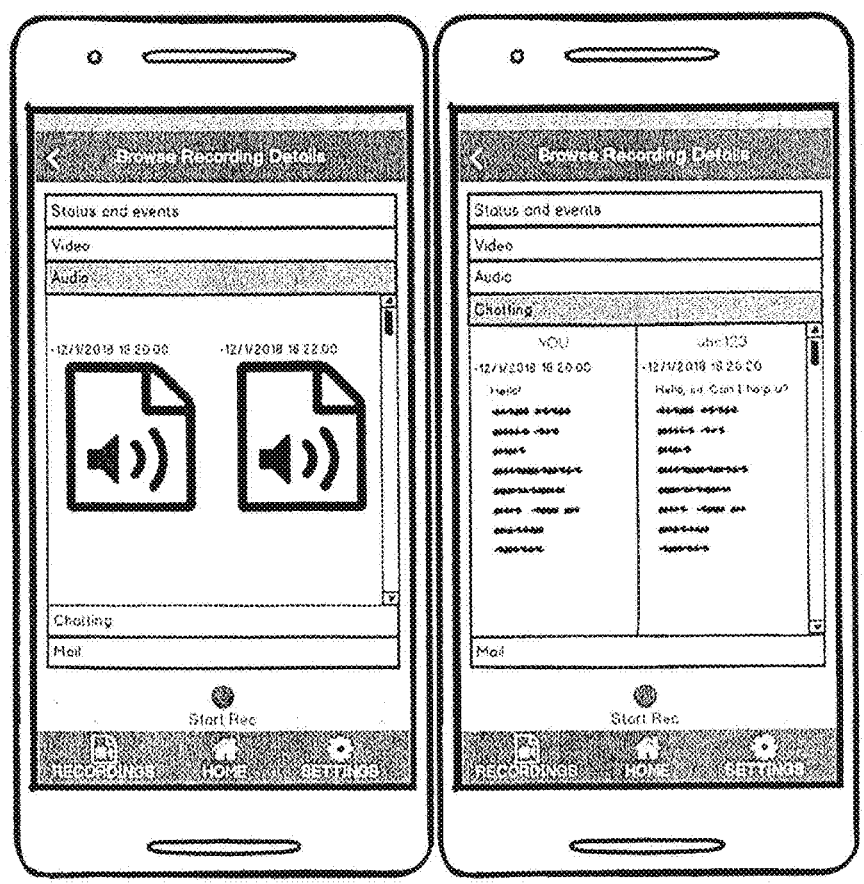
Figure 56:
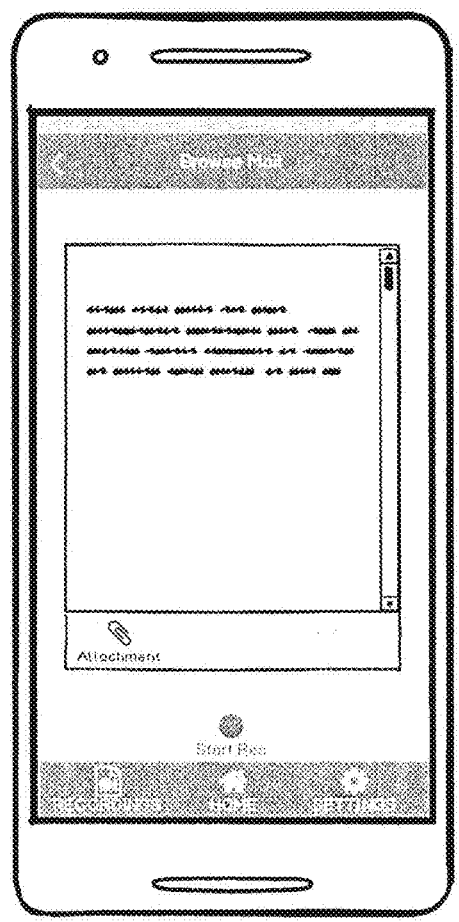
Figure 56:
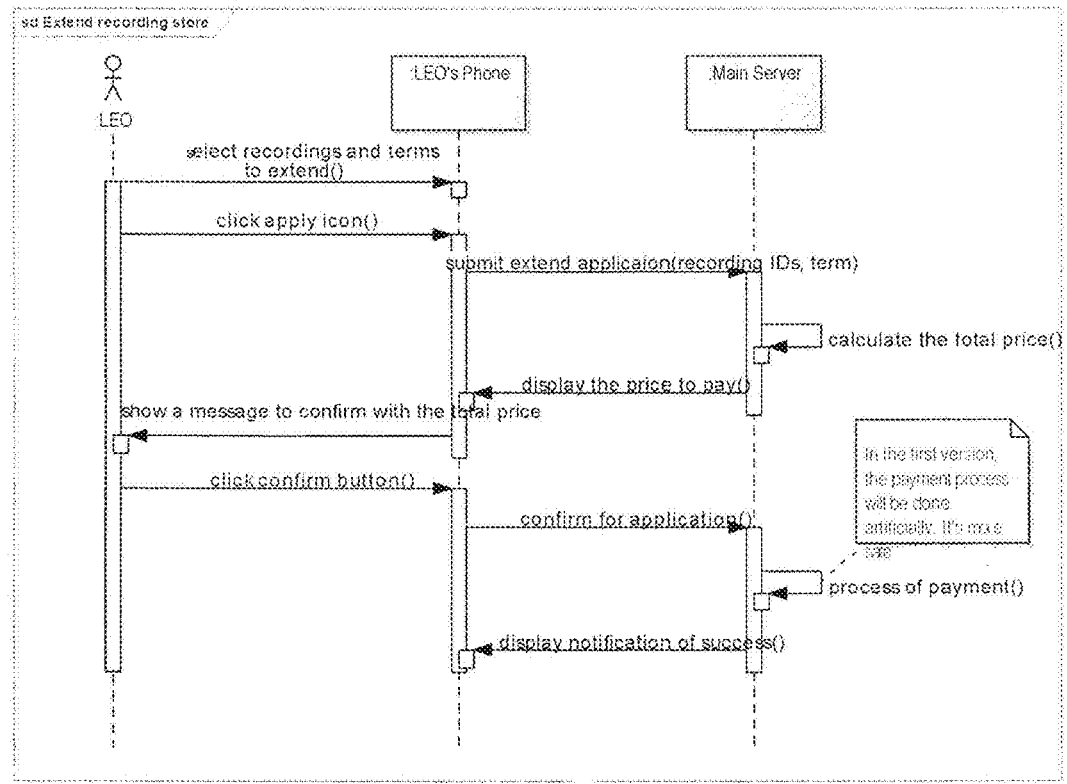
Figure 57:
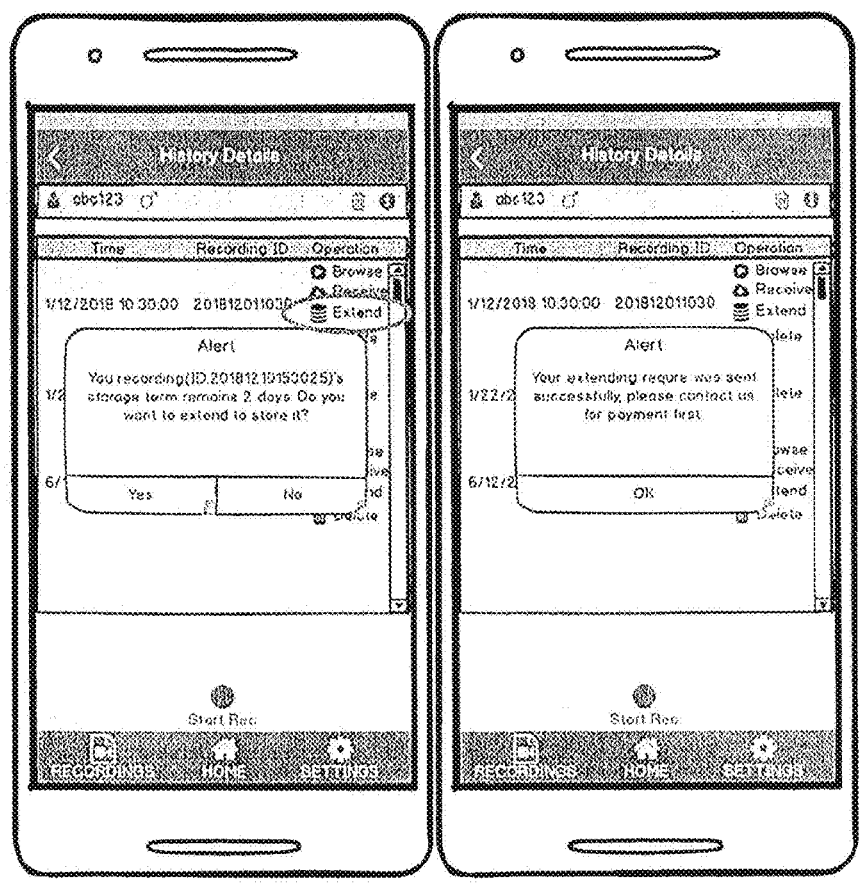
Figure 58:
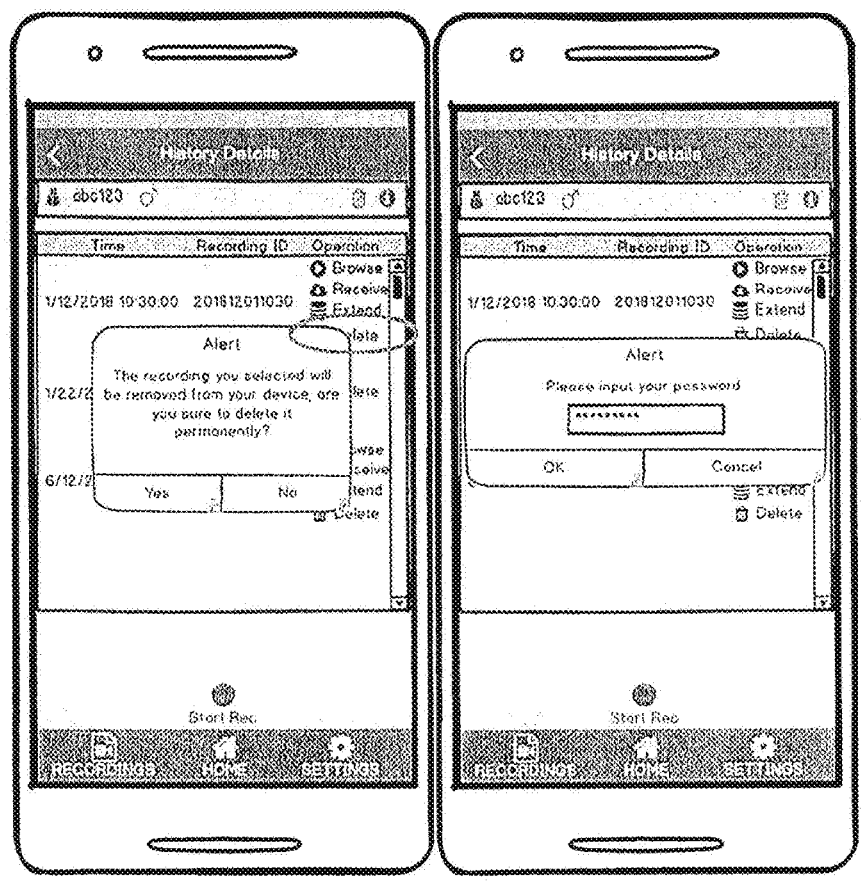
Figure 59:
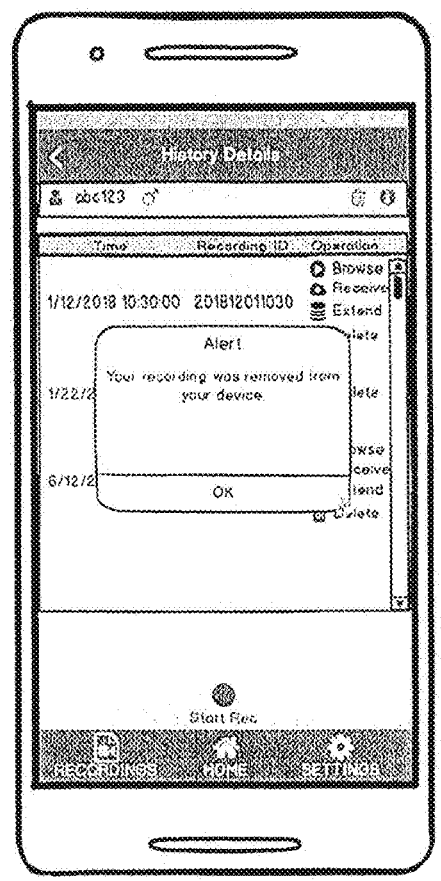
Figure 59:
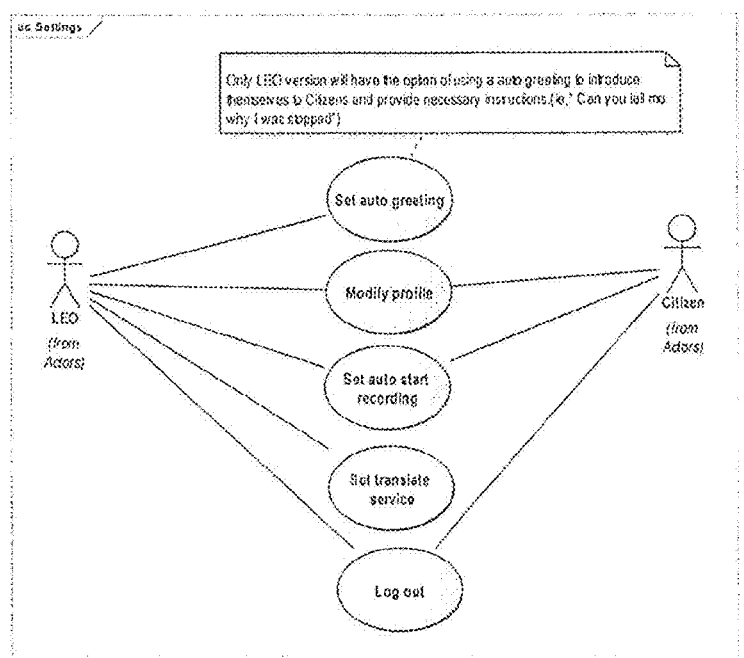
Figure 60:
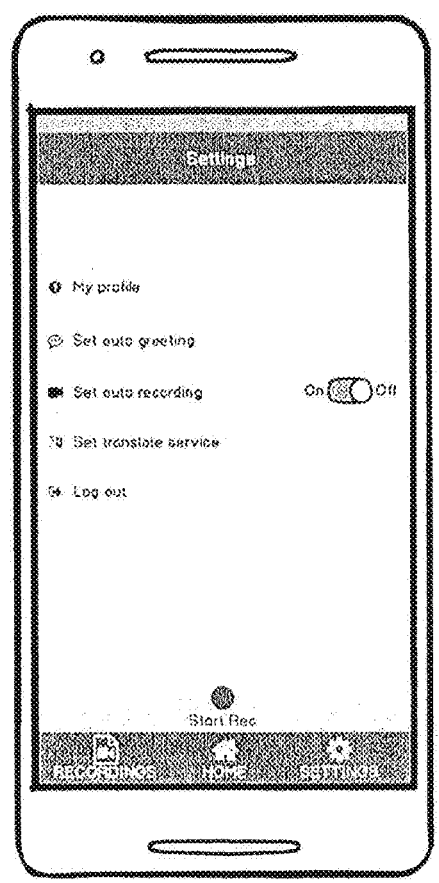
Figure 61:
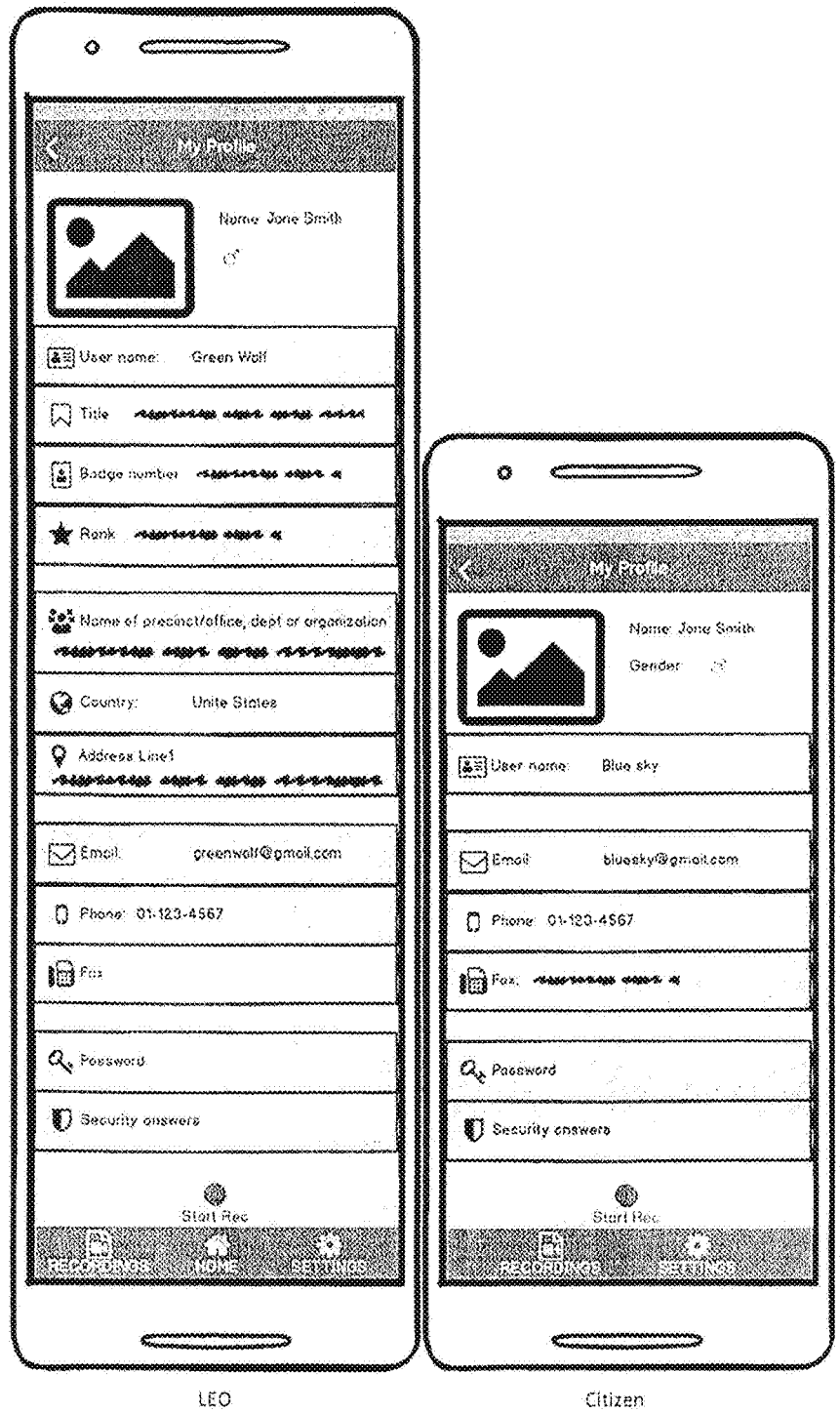
Figure 62:
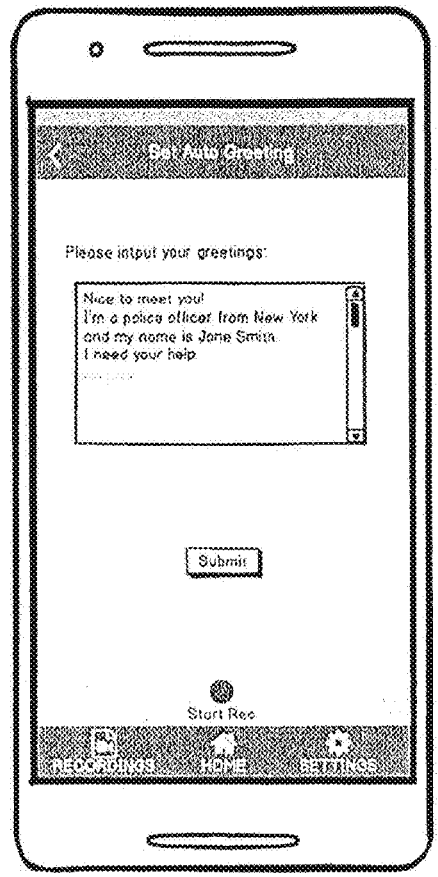
Figure 63:
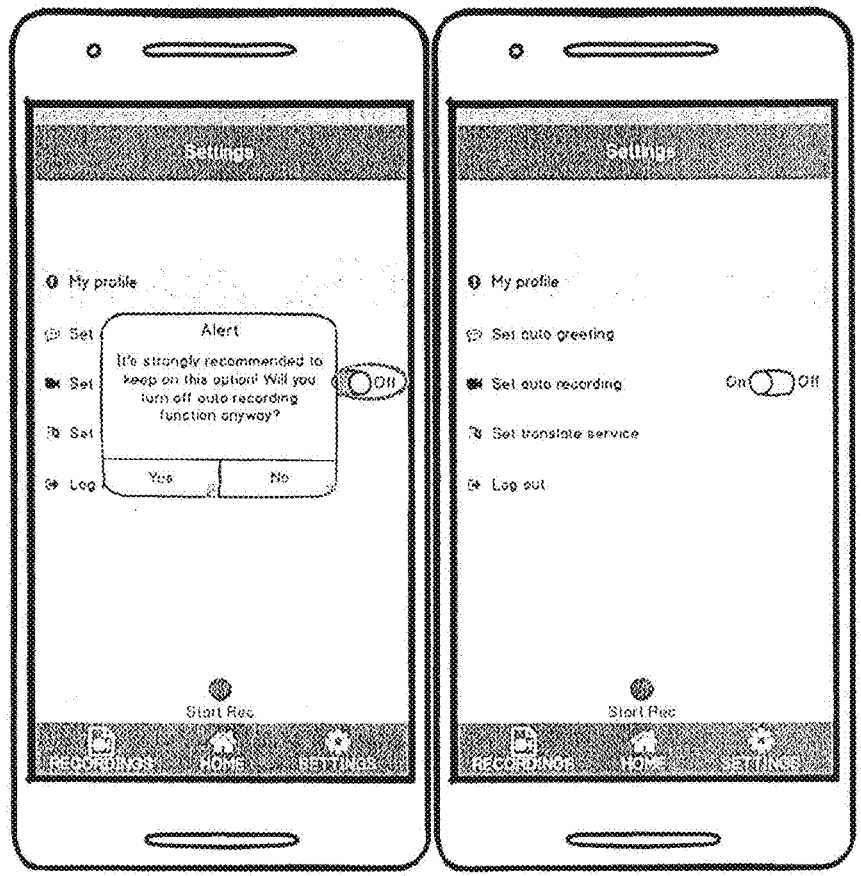
Figure 64:
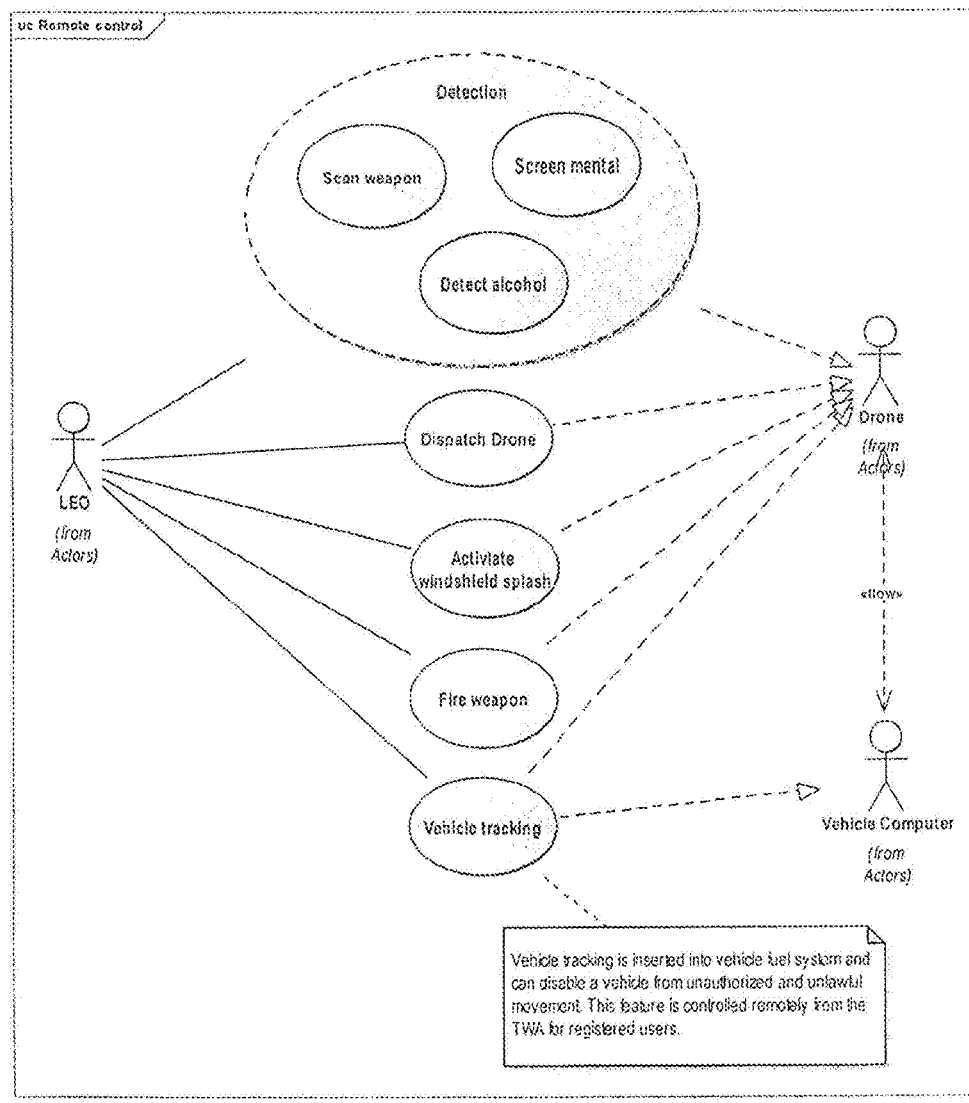
FIG. 64 is a block diagram depicting the remote-control feature.

FIG. 2 shows all "actors" 101, meaning all general components of the process and system including the citizens and LEOs. TWA uses technology to reduce the risk of mutual harm and violence between Law Enforcement Officers (LEOs) and Citizens. TWA creates a virtual policing system to supplement traditional police procedures and contact with the public.

Referencing now the remaining figures, each subset of figures is considered a module of the system and process. The application is compartmentalized into a LEO and a Citizen version, then to each module, namely: (1) use case and actor designation; (2) registration/login; (3) contact management; (4) communications; (5) recording; (6) device remote control.

(1) Use case and actor designation 102

The application focuses on LEO and Citizen as the primary and leading actors.

Supporting roles and descriptions are as follows:
- Person Authorized to Register (PAR) as a Senior LEO who will be responsible for registering Police and LEOs in their respective Precinct, State or County of Jurisdiction.
- LEO Headquarters (HQ) will manage and control advanced features and complicated situations (i.e., drone deployment, high speed chase, hostage, weapon scanning, terrorist situations and Drone firearm).
- TWA Administration will vet and provide super administrative oversight for all persons, devices and services associated with the application.

Devices used to facilitate various functions and features are as follows;
- Smartphones, Tablets, PCs and Vehicle Computers will be used for primary routine communication between LEO and Citizens.
- PCs, drones and TWA servers will be employed to provide more advanced features and services (i.e., PCs) Participation from HQ by Senior LEOs, Drones as or technological extension of LEO's authority to administer special functions such as weapon screen, breathalyzer test and shield splash, etc.
- TWA servers will house the software and provide super administration an oversight for all application features and services.

(2) Registration 103

All users of the TWA will be pre-registered LEOs and Citizens and will sign a mutual agreement of respect and harm reduction behavior when in contact and communication with each other.

TWA administration will generate a batch of alphanumeric tokens for each Person Authorized to Register (PAR). The PAR will submit a request for the number of tokens desired for the LEO's under their supervision. Each token in the batch will be assigned specifically and exclusively to the PAR for that municipality or precinct. Each token will be unique and can only be used once by the LEO to complete the TWA registration. The LEO be asked to enter their token at the end of the registration (i.e, after security questions) in order to complete the online registration. If the Token that the LEO uses is incorrect, it will (a) not be detected in the token data base and the registration will be rejected and (b) tokens that have successfully been used will automatically be flagged and deleted from the data base. Any attempt to use a deleted or previously used token will cause the LEO attempted registration to be rejected. As part of TWA security, and to deter fraudulent attempts to register TWA, admin will automatically be notified of any LEO registrations that are rejected. PAR will have to submit a request for additional or replacement tokens and possibly provide an explanation for rejected LEO registration as a result of an unaccepted token entry. TWA administration reserves the right to reject any LEO registration that violates TWA policies and procedures (3) Contact management 104

Contact management will be designed into the application so that LEOs will be the only user able to initiate contact for communication. LEO will be limited to communicating with Citizen user in their vicinity, other LEOs, Supervisors, and authorized person in their contact list. LEO can blast alert text to all registered TWA Citizens in a particular area (e.g. vicinity of suicide bomber). Citizen users will only be able to communicate with LEO who have initiated contact with them.

(4) Communication 105

A/V Conferencing will serve as the primary foundation for communication for the application and will accommodate 2-6 actors concurrently. By circumstance and/or choice, audio and text and pre-recorded scripts can be used to substitute for communication between actors (users).

(5) Recordings 106

A/V recording will serve as a critical and fundamental feature and source of evidence of the contact between LEO and Citizens. All users will have the recording feature and it will activate immediately and automatically by touching the TWA icon.

A Common Copy of the recording will automatically be stored on the user's device and a copy (certified or otherwise) will simultaneously be transmitted to TWA servers as a "Certified Copy" unable to be altered by user for future retrieval. Any user can elect to have a certified copy of their recording submitted to the Court presiding over the jurisdiction of the contact.

6 (Remote Control) 107

Remote control of advanced features such as weapons scan, alcohol test, windshield splash, firearms, will be remotely controlled by LEO's headquarters. The Drone will be the primary vehicle and technological extension of Police authority. The Drones will be controlled by specially trained personnel at LEO Headquarters. The Drone will be specially selected and designed with attachments to carry and release various devices (i.e., weapon scanner, breathalyzer, gun) integrated and controlled by TWA software.

More particularly, as it relates to the remote control function, if A/V conferencing is the foundation for the TWA, DRONES provide the flexibility for achieving the maximum benefits of the TWA in a variety situations consistent with LEOs performing their work safely, with reduced risk to harm and violence to themselves and Citizens. The use of DRONES plays an essential role in the TWA process as they represent an extension of the LEO's physical presence and legal authority. There have been many technological advances that are relevant for use by law enforcement. Some of the more prominent technologies are small wireless weapon scanners, breathalyzers and facial recognition software. Unfortunately, with the exception of facial recognition, the weapon scanners and breathalyzers require LEOs and Citizens to be physically exposed to each other and therefore still being at risk for inflicting mutual harm and violence. Using facial recognition can help LEO determine if the Citizen has a history of criminality and/or violence. However, whether or not the Citizen has a criminal history and/or legal or illegal weapons in their procession, a LEO cannot scan for weapons or administer a breathalyzer without having physical proximity and exposure to risk and harm. At best, LEO has to assume that the Citizen is of sound mind and judgement, is not having a bad day, and holds no malice towards LEOs. Integrating these technologies with the TWA Drone allows these technologies to be administered remotely, without LEO or Citizens being physically exposed to harm each other. Drones integrated with the TWA can deliver breathalyzers tests to Citizens as an extension of the LEO to assess their sobriety. The TWA will integrate the BAC Track Professional Breathalyzers into its application. The BAC Track Professional Breathalyzer is the smallest police grade device weighting 1.5 oz and has Bluetooth connectivity to Apple and Android Devices. The breathalyzer works using fuel cell sensors that rely on an electrochemical process that oxidizes the alcohol in a breath sample and produces an electrical current that the breathalyzer measures to determine the Blood Alcohol Content (BAC). The results are automatically transmitted back to the LEO's device in real time for evaluation. LEOs will receive education and training on alcohol and substance abuse, mental illness, behavior, signs and symptoms. A predetermined script and protocol will be integrated into the TWA to allow them to perform a basic Mental Status screen. LEO will also have the option of conferring with a mental health professional in real time via the TWA multi conferencing feature so that said professional will be able to see, hear and talk to the Citizen concurrently with the LEO, in real time.

The TWA creates virtual process that will allow LEO to scan and detect the presence of guns and other weapons on a Citizen's body, in any environment, especially in the Citizen's vehicle or residence (see Figure #1). The TWA will also integrate into its software the "SWORD", the world's first mobile 3D imaging scanner. The scanner attaches to a Google Pixel 2 XL smartphone and Apple's iPhone 8 Plus. It is accessed and controlled via a fully customizable and dedicated app technology from a distance of up to 40 feet. Security agents or law enforcement personnel can scan individuals in a crowd, or an approaching person of interest, simply by pointing their Smartphone at them with the scanner device attached. They will be able to rapidly identify a person of interest, determine if someone is carrying a weapon, gun, knife explosives, etc., all without the physical contact and presence of a LEO. The scanner can be used to scan backpacks and handbags that are being carried or have been left unattended. It can also detect listening devices used for espionage and intelligence gathering.

The present limitations of the scanner are (a) the LEO needs to have a clear line of vision and (b) be no more than 40 ft from the person being scanned. Being able to clear away interfering object or persons, or maneuver the person into a clear and isolated area would require some exposure for LEO. Also, being separated by 40 ft. from a suspect is convenient, but not safe or out of range for most guns.

The advantage and contribution of integrating this scanner technology into the TWA is that the LEO will be able to reap the safety benefits of the scanner, without physically exposing themselves to the potential perpetrator or carrier of the weapon. The advantages are especially evident when the scanner is paired with the TWA Drone.

In use therefore, with TWA, a LEO can contact and request any Citizen in any situation or environment (i.e, on the street, in a store, at work, on campus) to communicate with them. The LEO can initiate contact with a Citizen, and if deemed necessary, proceed with a weapons scan. If the LEO is on foot patrol, they can request a patrol car or headquarters to dispatch a Drone equipped with camera, microphone, speaker and weapon body scanner to the Citizen's location. Using the Drone as an extension of their authority, LEO can see, hear, and talk to Citizen in real time. LEO can instruct Citizen to sit, stand up, raise arms, hands, turn left or right, etc. He can also activate the body scanner attached to the Drone and remotely move the Drone up, down and around the Citizen's body (see Figure #1).

The LEO can also use the Drone to obtain a breathalyzer test for alcohol with the results transmitted back to the LEO's device. LEO can instruct Citizen to walk a straight line, touch his nose with his finger, repeat tongue twisters, etc. The Drone camera can zoom onto the Citizen's face, focus and magnify certain features (i.e, eyes), and/or have the Citizen recite verbal phrases, etc. The full and complete contact between the LEO and Citizen is recorded and stored on LEO's and Citizens' device, and TWA's server for future review.

LEO is able to initiate a request with Citizen while both remain in their vehicles. LEO and Citizen may question and answer using auto greeting or actual real time verbal exchange via A/V Conferencing from their respective Smartphones, Drones or other devices. At their discretion, LEO may dispatch or have deployed the TWA Drone. The Drone may initially be situated on the hood of the Citizens vehicle, hovering in front of the windshield of Citizen's vehicle (see Figure #3). Using said Drone, LEO may target, zoom or otherwise view various parts of Citizen or other passenger's face, access physical abilities, and/or perform substance abuse and mental status screens. The Drone may be maneuvered to scan for guns and other weapons on the Citizens or inside their vehicle. The Citizen and passenger may be instructed to exit the vehicle for body scanning and/or additional instructions. All activity between LEO and Citizen is recorded on their respective devices and uploaded to TWA servers for future review.

TWA can be used to help LEOs respond and screen calls for domestic violence (see Figure #4). LEO will be able to see, hear and talk to involved persons from a remote location before knocking on the door or entering a residence where the conflicts exist. LEO may initiate contact and communicate with Citizens via their smartphone from a remote location. They can:
- issue instruction and direction (i.e., sit down, stop talking, leave the room, step outside, etc.)
- instruct Citizens to open a door or window to allow communication via the TWA Drone as an extension of LEO's authority. The Drone will be able to scan individual's presence for guns and weapons, determine if there are any other persons or pets that may present a danger or threat to LEO or Citizens involved. Citizens can be instructed to sit, stand, go to a different room, step outside etc. via the Drone. A mental status, substance abuse screen examination can be conducted remotely in real time. TWA avoids and reduces the traditional risks when LEO responds to house and domestic violence calls. The TWA allows LEO to perform a preliminary risk assessment before being exposed to physical harm and violence. It provides Citizens the opportunity to contact and communicate with LEO and demonstrate their cooperation, reducing the perception of their being a threat and provoking excessive use of force by LEO.
- The contact between LEO and Citizen is recorded on their respective devices and sent to TWA servers for future review.

High speed chases are one of the most dangerous activities for law enforcement, bystanders, and the passengers of the vehicle in pursuit. The TWA proposes two options to reduce the incidence and consequences associated with high speed chases. The first option is to offer Citizens who register with TWA the option to insert a vehicle tracking device in their vehicle that would allow the vehicle to be remotely tracked and stopped in the event of (a) unauthorized use by children or family members, (b) carjacking, and/or (c) it being stolen. It will also be indicated that having the tracking device inserted will be an indication of their good faith and intention to comply with and cooperate with LEO. TWA will solicit cooperation and support from the insurance industry to provide discounts to Citizen participating in the High Speed Chase Reduction Program (HSCRP). (see Figure #2). Vehicles registered in the Program that are involved in a high-speed chase movement can be stopped and stalled by LEO from their Devices, or from a high speed Drone dispatched from their vehicle or LEO Headquarters. Vehicles that are not registered with TWA that are involved in a high-speed chase can be pursued by a TWA Drone. A visual impairment colored sticky solution (Splash, or Balm) will be dispersed by the Drone on the vehicle's front windshield. This solution will impair the driver's ability to navigate the vehicle. The Drone will also be able to maintain its position, follow, photograph and record the chase, the vehicle, and identity of the driver and passengers. The TWA reduces the situations where Citizens are perceived as a threat to LEO often forcing them to choose between the use of excessive and fatal force or becoming a victim of Citizen violence.

TWA can almost instantaneously establish checkpoints and screening for weapons and dangerous persons in any situation or public environment. Sobriety and mental status can be conducted remotely, at any time, in bus, train stations, boat and airplane terminals, and sporting venues with the benefits and advantages for LEO and Citizens. As previously indicated, TWA Drones could be dispatched at any time by LEOS on site established as temporary or permanent stations or used as a mobile representation of LEO's authority upon request, or in emergency situations and remote locations. The application and its features can be initiated and controlled by an individual LEO using their Smartphone or from a PC at LEO headquarters.

The TWA Drone can be activated and deployed internally in cars, trucks, buses, trains and planes to provide LEO with a remote and safe means of assessing and reducing the risk associated with required contact and communication with the Public.

I claim:

1. A video conferencing and law enforcement corroboration system, comprising:
   a smartphone including a camera and a mobile application software having an application programming interface and control logic stored therein for causing said smartphone to:
      establish a video feed between actors including a law enforcement officer and a perpetrator, thereby forming a remote, real time communication between said law enforcement officer and said perpetrator;
      locate and identify a location and proximity of nearby users of the same said mobile application software;
      notice said perpetrator of said video feed;
      allow for an exchange of pre-scripted auto greetings, wherein said perpetrator may remotely ask for a reason for a stop using impartial, prompted language, to thereby objectivize initial contact between said law enforcement officer and said perpetrator; prompt said law enforcement officer or said perpetrator to invite participation by a corroborating third party, wherein a two-way, real-time communication of said video feed can generate conference information;
      view an identity of said perpetrator, a driver document and a vehicle search remotely via said real time communication between said law enforcement officer and said perpetrator, wherein an interaction between said law enforcement officer and said perpetrator is documented without physical conflict and without exposing said perpetrator and said law enforcement officer to physical harm and violence;
      share said conference information, wherein said interaction is corroborated without exposing said law enforcement officer and said perpetrator to physical harm and violence;
   a use case and actor designation module as part of said mobile application software, wherein all said actors associated with said mobile application software are vetted for purposes of registration;
   a contact management module as part of said mobile application software, wherein said law enforcement officer is the only of said actors who is able to initiate an initial contact with said perpetrator; and,
   a recording module as part of said mobile application software, wherein said communication is automatically stored on said smartphone and activated upon touching an icon; wherein said communication is adapted to be transmitted to a central storage even upon an involuntary interruption.

2. The system of claim 1, further comprising a drone and drone technology using said application programming interface, said drone further establishing said a video feed between said law enforcement officer and said perpetrator.

3. The system of claim 2, further comprising a weapon scanner integrated into said application programming interface.

4. The system of claim 2, further comprising a breathalyzer.

5. The system of claim 4, wherein said breathalyzer is delivered by said drone.

6. The system of claim 2, further comprising a windshield splash consisting of alcohol, mineral oil, colored dye, volatile silicones, film formers, plasticizers and polymers, wherein said windshield splash can be deployed onto a windshield of a vehicle.

7. The system of claim 2, further comprising a remote control module for controlling said drone.

8. The system of claim 1, further comprising a means for issuing a citation remotely.

9. The system of claim 1, further comprising a predetermined script to allow for a performance of a mental status screen by said law enforcement officer such that a mental health professional can be conferred with in real time.

* * * * *